(12) United States Patent
Ryu et al.

(10) Patent No.: US 9,749,730 B2
(45) Date of Patent: Aug. 29, 2017

(54) METHOD FOR PROCESSING DATA AND ELECTRONIC DEVICE THEREFOR

(71) Applicant: Samsung Electronics Co., Ltd., Gyeonggi-do (KR)

(72) Inventors: Kyu-Sang Ryu, Gyeonggi-do (KR); Yu-Jin Choi, Gyeonggi-do (KR); Eui-Bum Han, Gyeonggi-do (KR); Daniel Hwang, Gyeonggi-do (KR)

(73) Assignee: Samsung Electronics Co., Ltd., Yeongtong-gu, Suwon-si, Gyeonggi-do (KR)

( * ) Notice: Subject to any disclaimer, the term of this patent is extended or adjusted under 35 U.S.C. 154(b) by 92 days.

(21) Appl. No.: 14/834,786

(22) Filed: Aug. 25, 2015

(65) Prior Publication Data

US 2016/0057553 A1 Feb. 25, 2016

(30) Foreign Application Priority Data

Aug. 25, 2014 (KR) ........................ 10-2014-0110697

(51) Int. Cl.
*H04R 1/10* (2006.01)
*H04M 1/60* (2006.01)

(52) U.S. Cl.
CPC ........ *H04R 1/1041* (2013.01); *H04M 1/6066* (2013.01); *H04R 2420/07* (2013.01)

(58) Field of Classification Search
CPC ........ H04B 1/205; H04B 1/202; H04B 1/207; H04B 1/20; H04B 2203/545; H04B 3/54; H04N 5/765; H04N 21/43615; H04N 5/775; H04N 5/44; H04N 5/4403
USPC ........................................................ 340/4.41
See application file for complete search history.

(56) References Cited

U.S. PATENT DOCUMENTS

| 8,295,766 B2* | 10/2012 | Zimbric | H04M 1/7253 455/41.2 |
| 2002/0068610 A1* | 6/2002 | Anvekar | H04M 1/6066 455/560 |
| 2006/0135204 A1* | 6/2006 | Angelhag | H04M 1/6041 455/557 |
| 2007/0206829 A1* | 9/2007 | Weinans | H04M 1/6066 381/370 |
| 2009/0061769 A1 | 3/2009 | Zimbric et al. | |

* cited by examiner

*Primary Examiner* — Mark Blouin
(74) *Attorney, Agent, or Firm* — Cha & Reiter, LLC.

(57) ABSTRACT

A method for operating an electronic device may include: outputting audio data to be reproduced through an output device connected thereto. A user input for a device change is detected and a reproduction request information is generated including at least one of audio information and output information corresponding to the audio data. The reproduction request information is transmitted to another electronic device communicatively connectable to the output device.

20 Claims, 12 Drawing Sheets

METHOD FOR PROCESSING DATA AND ELECTRONIC DEVICE THEREFOR

CLAIM OF PRIORITY

This application claims the priority under 35 U.S.C. §119(a) from Korean Application Serial No. 10-2014-0110697, which was filed in the Korean Intellectual Property Office on Aug. 25, 2014, the entire content of which is hereby incorporated by reference in its entirety.

BACKGROUND

Field of the Disclosure

Various embodiments of the present disclosure relate to a method and electronic device for processing data between electronic devices.

Description of the Related Art

An electronic device may output stored audio data (for example, a sound source) to an output device such as a headset, connected through wireless communication, such as Bluetooth (e.g., Bluetooth headsets), and a user may listen to the audio data of the electronic device via the output device. The user, while listening to the audio data reproduced in the electronic device via the output device, may also try to listen to audio data stored in another electronic device.

When a user, while listening to the audio data of the electronic device via the output device, wants to listen to the audio data of another electronic device via the output unit, the user may listen to the audio data of the another electronic device via the output device by performing a complicated operation. For example, the user can release the wireless communication connection (e.g., Bluetooth connection) between the electronic device and the output device through a menu-driven operation using the electronic device to release the wireless connection there between. In addition, the user may listen to audio data of the "another" electronic device via the output device by performing wireless communication connection (e.g., Bluetooth connection) with an output device through a menu operation using another electronic device. Accordingly, the user experiences inconveniences of performing multiple operations in order to change (switch) source devices (e.g., electronic device, another electronic device) of audio data. Therefore, there is a long-felt need in the art to provide a more convenient way of switching source devices that does not require multiple operations.

SUMMARY

Various embodiments of the present disclosure provide a method and device for processing data between electronic devices which can support automatic connection between another (i.e. a second) electronic device and the output device when the output device is disconnected from the first electronic device.

Various embodiments of the present disclosure provide a method and device for processing data between electronic devices which enables audio data of another (i.e. a second) electronic device to be output via an output device by processing an automatic connection with the output device by the another electronic device connected to the electronic device when the first electronic device, in a state where the electronic device is connected to the output device, receives a control command for controlling so as to change a device for reproducing audio data.

In accordance with various embodiments of the present disclosure, a method for operating an electronic device is provided. The method includes: determining at least one of audio information and external output information; and transmitting the determined information as reproduction request information to another electronic device.

In accordance with various embodiments of the present disclosure, a method for operating an electronic device is provided. The method includes: outputting audio data through an output device connected to a first electronic device; detecting a user input for a device change; generating reproduction request information including at least one of audio information and output information corresponding to the audio data; and transmitting the reproduction request information to a second electronic device connectable to the output device.

In accordance with various embodiments of the present disclosure, a method for operating an electronic device is provided. The method includes: detecting a user's input for a device change; transmitting reproduction stop request information for stopping reproduction of the audio data to another electronic device connected thereto; receiving the reproduction stop information corresponding to the reproduction stop request information from the electronic device; connecting to the output device based on the reproduction stop information; and reproducing audio data based on the reproduction stop information and outputting the reproduced audio data via the output device.

In accordance with various embodiments of the present disclosure, an electronic device may include: a communication interface; and a processor that processes identify at least one of audio information and external output information, and transmit the identified information as reproduction request information to another electronic device through the communication interface.

In accordance with various embodiments of the present disclosure, an electronic device may include: a communication interface; a display; and a processor connected functionally to the communication interface and the display, the processor comprises hardware circuitry and may include: controlling the outputting of audio data through an output device connected to the electronic device; detecting a user input for a device change; generating reproduction request information including at least one of audio information and output information corresponding to the audio data; and transmitting the reproduction request information to another electronic device connectable to the output device.

In accordance with various embodiments of the present disclosure, provided is a non-transitory computer-readable recording medium comprising a program for executing operations when loaded into hardware such as a processor, microprocessor or controller, the operations comprising: outputting audio data through an output device connected to the electronic device; detecting a user's input for a device change; generating reproduction request information including at least one of audio information and the output information corresponding to the audio data; and transmitting the reproduction request information to another electronic device connectable to the output device.

BRIEF DESCRIPTION OF THE DRAWINGS

The above and other exemplary aspects, features, and advantages of the present disclosure will become more apparent to a person of ordinary skill in the art from the following detailed description taken in conjunction with the accompanying drawings, in which.

DETAILED DESCRIPTION

Figure 1:
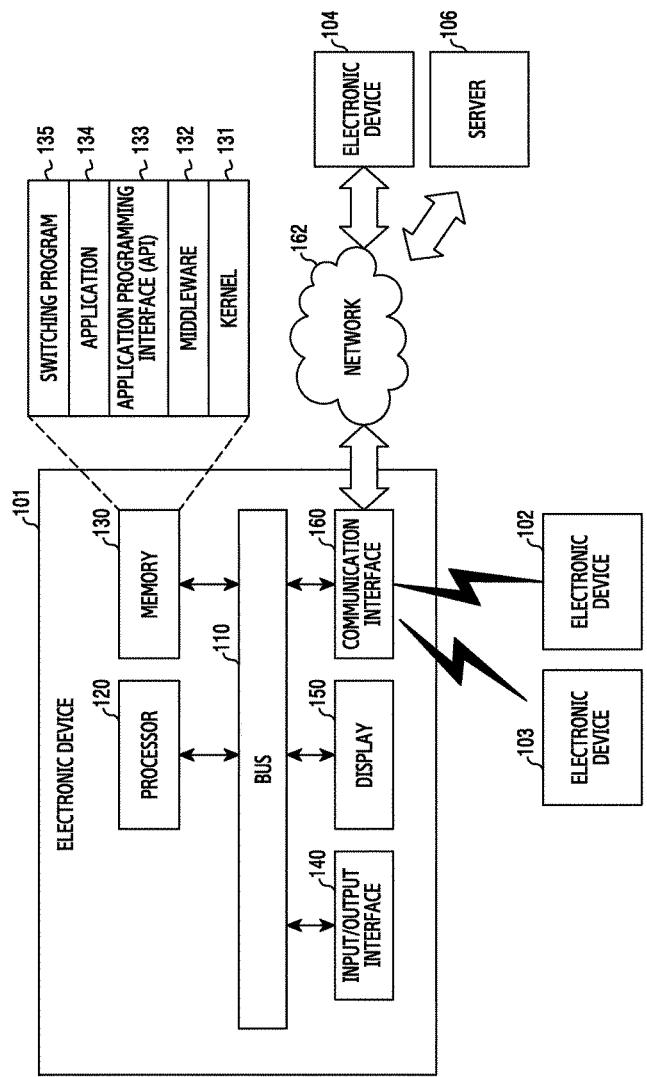
FIG. 1 illustrates a network environment including an electronic device according to various embodiments of the present disclosure.

Hereinafter, various embodiments of the present disclosure will be now be described with reference to the accompanying drawings.

According to various embodiments of the present disclosure, an operation that switches the electronic device including a source (e.g., audio data) of an audio sound to be reproduced by the user controlling the electronic device in which at least one of audio data is stored and another electronic device and further, an operation of outputting through the specified output device can be performed.

The present disclosure has various embodiments, and modifications and changes may be made therein. Therefore, the present disclosure will now be described in detail with reference to particular embodiments shown in the accompanying drawings. However, it should be understood by a person of ordinary skill in the art that the present disclosure is not limited to the particular embodiments shown and described, but includes all modifications, equivalents, and/or alternatives within the spirit and scope of the present disclosure. In the description of the drawings, similar reference numerals may be used to designate similar elements.

The terms "include" or "may include" refers to the existence of a corresponding disclosed function, operation or component which can be used in various embodiments of the present disclosure and does not limit one or more additional functions, operations, or components. Further, as used in various embodiments of the present disclosure, the terms "include", "have", and their conjugates are intended merely to denote a certain feature, numeral, step, operation, element, component, or a combination thereof, and should not be construed to initially exclude the existence of or a possibility of addition of one or more other features, numerals, steps, operations, elements, components, or combinations thereof.

Furthermore, as used in various embodiments of the present disclosure, the expression "or" includes any or all combinations of words enumerated together. For example, the expression "A or B" may include A, may include B, or may include both A and B.

In the present disclosure, expressions including ordinal numbers, such as "first" and "second," etc., may modify various elements. However, such elements are not limited by the above expressions. For example, the above expressions do not limit the sequence and/or importance of the elements. The above expressions are used merely for the purpose of distinguishing an element from among the other elements, particularly those with the same name. For example, a first user device and a second user device indicate different user devices although both of them are user devices. For example, without departing from the scope of the present disclosure, a first component element may be named a second component element. Similarly, the second component element also may be named the first component element.

When an element is referred to as being "coupled" or "connected" to any other element, it should be understood that not only the element may be coupled or connected directly to the other element, but also a third element may be interposed therebetween. Contrarily, when an element is referred to as being "directly coupled" or "directly connected" to any other element, it should be understood that no element is interposed therebetween.

The terms as used in various embodiments of the present disclosure are used merely to describe a certain embodiment and are not intended to limit the present disclosure. As used herein, singular forms may include plural forms as well unless the context explicitly indicates otherwise. Furthermore, all terms used herein, including technical and scientific terms, have the same meaning as commonly understood by those of skill in the art to which the present disclosure pertains. Such terms as those defined in a generally used dictionary are to be interpreted to have the meanings equal to the contextual meanings in the relevant field of art, and are not to be interpreted to have ideal or excessively formal meanings unless clearly defined in various embodiments of the present disclosure.

An electronic device according to various embodiments of the present disclosure may be a device including a communication function. The electronic device according to various embodiments of the present disclosure may, for example, include but are not limited to at least one of a smart phone, a tablet personal computer (PC), a mobile phone, a video phone, an e-book reader, a desktop PC, a laptop PC, a netbook computer, a personal digital assistant (PDA), a portable multimedia player (PMP), an MP3 player, a mobile medical device, a camera, a wearable device (e.g., a headmount-device (HMD) such as electronic glasses, electronic clothing, an electronic bracelet, an electronic necklace, an electronic "appcessory", an electronic tattoo, or a smart watch), a television, a digital video disk (DVD) player, an audio device, a refrigerator, an air conditioner, a vacuum cleaner, an oven, a microwave oven, a washing machine, an air cleaner, a set-top box, a TV box (e.g., Samsung HomeSync™, Apple TV™, or Google TV™), a game console, an artificial intelligence robot, a Television (TV), an electronic dictionary, an electronic key, a camcorder, medical equipment (e.g., a magnetic resonance angiography (MRA) machine, a magnetic resonance imaging (MRI) machine, a computed tomography (CT) scanner, or an ultrasonic machine), a navigation device, a global positioning system (GPS) receiver, an event data recorder (EDR), a flight data recorder (FDR), a vehicle infotainment device, electronic equipment for a ship (e.g., ship navigation equipment and a gyrocompass), avionics, security equipment, an industrial or home robot, a part of furniture or building/structure, an electronic board, an electronic signature receiving device, a projector, and various measuring instruments (e.g., a water meter, an electricity meter, a gas meter, or a wave meter), are just some of the non-limiting possible examples of devices, each of which includes a communication function. An electronic device according to embodiments of the present disclosure may be a device including a fingerprint recognition sensor. The electronic device according to various embodiments of the present disclosure may be a combination of one or more of the aforementioned various devices. Further, the electronic device according to various embodiments of the present disclosure may be a flexible device. Further, it will be apparent to those of ordinary skill in the art that the electronic device according to various embodiments of the present disclosure is not limited to the aforementioned devices.

Hereinafter, an electronic device according to various embodiments of the present disclosure will be described with reference to the accompanying drawings. The term "user" as disclosed in various embodiments of the present disclosure may indicate a person who uses an electronic device or a device (e.g., artificial intelligence electronic device) that uses an electronic device.

FIG. 1 illustrates a network environment including an electronic device according to various embodiments of the disclosure.

Referring now to FIG. 1, the electronic device 101 may include at least one of a bus 110, a processor 120, a memory 130, an input/output interface 140, a display 150, and a communication interface 160.

The bus 110 may be a circuit that connects the aforementioned elements to each other and transmits communication signals (e.g., control messages) between the aforementioned elements.

The processor 120 comprises hardware such as integrated circuitry that is configured for operation. The processor 120 may, for example, receive commands from the above-mentioned other elements (e.g., the memory 130, the input/output interface 140, the display 150, and the communication interface 160) via the bus 110, interpret the received commands, and perform calculations or data processing according to the interpreted commands.

One or more processors 120 may be included in the electronic device 101 to perform a predetermined function of the electronic device 101. According to an embodiment, the processor 120 may include one or more Application Processors (APs) and one or more Micro Control Units (MCUs). According to another embodiment, the processor 120 may include one or more micro control units that provide applications or may be functionally connected to one or more micro control units. In FIG. 1, the AP and the MCU may be included in one IC package, or may be separately configured to be included in different IC packages, respectively. According to an embodiment, the MCU may be included in an IC package of the AP to be configured as one IC package together with the AP. Although the processor 120 includes the AP or the MCU in FIG. 2, this schematic is only provided for illustrative persons to provide the person of ordinary skill in the art with a clear understanding, but the artisan understands and appreciates that the processor 120 may also perform operations of the AP and/or the MCU.

The AP may drive an operating system or an application program so as to control a plurality of hardware or software components connected to the AP, and may process various pieces of data including multimedia data and perform calculations. The AP may be implemented by, for example, a System on Chip (SoC). According to an embodiment, the processor 210 may further include a Graphic Processing Unit (GPU) (not illustrated).

The MCU may be a processor that is configured to perform one or more predetermined operations. According to an embodiment of the present disclosure, the MCU may acquire sensing information through at least one specified motion sensor (e.g., gyro sensor, acceleration sensor, or geomagnetic sensor), compare the acquired sensing information, and determine the operational state of the specified motion sensor by making reference to a database of the electronic device 101.

According to an embodiment, the AP or the MCU may load a command or data received from at least one of a non-volatile memory and other components connected to each of the AP and the MCU in a volatile memory, and may process the loaded command or data. Further, the AP or the CP may store data received from or generated by at least one of the other components in a non-volatile memory.

The memory 130, which is a non-transitory memory, may store commands or data received from the processor 120 or other elements (e.g., the input/output interface 140, the display 150, and the communication interface 160), or generated by the processor 120 or other elements. The memory 130 may include programming modules, for example, a kernel 131, middleware 132, an Application Programming Interface (API) 133, applications 134, or the like. Respective program modules described above may be implemented by hardware, software that configures hardware, firmware in conjunction with hardware, or any combination of these implementations.

The kernel 131 may control or manage the remaining programming modules, for example, system resources (for example, the bus 110, the processor 120, or the memory 130) used for executing operations or functions implemented in the middleware 132, the API 133, or the applications 134. Also, the kernel 131 may provide an interface to the middleware 132, the API 133, or the application 134, so as to access each component element of the electronic device 101 for controlling or managing.

The middleware 132 may perform a relay function which allows the API 133 or the applications 134 to communicate with and exchange data with the kernel 131. Further, the middleware 132, with regard to the task request received from the application 134, may perform control (e.g., scheduling or load balancing) with respect to the task request using, for example, a method such as assigning priorities capable of using the system resources (e.g., bus 110, processor 120, or memory 130, etc.) of the electronic device 101 to the one or more applications from among the applications 134.

The API 133 is an interface used by the application 134 to control a function provided from the kernel 131 or the middleware 132, and may include, for example, at least one interface or function, for example, an instruction, for a file control, a window control, image processing, a character control, or the like.

The applications 134 may include, for example, a short message service (SMS)/multimedia message service (MMS) application, an e-mail application, a calendar application, an alarm application, a health care application (e.g., application for monitoring physical activity or blood glucose), and an environmental information application (e.g., application for providing atmospheric pressure, humidity, or temperature information). The application 134 may correspond to an application associated with information exchange between the electronic device 101 and an external electronic device (e.g., the electronic device 102 or the electronic device 104). The application related to the information exchange may include, for example, a notification transmission application for transferring predetermined information to an external electronic device or a device management application for managing an external electronic device. The notification relay application may, for example, include a function of transferring, to an external electronic device (e.g., the electronic device 104), notification information generated by other applications (e.g., an SMS/MMS application, an e-mail application, a health management application, or an environmental information application) of the electronic device 101. Additionally or alternatively, the notification relay application may receive notification information from, for example, the external electronic device (e.g., the electronic device 104) and provide the received notification information to a user. For example, the device management application may manage (e.g., install, delete, or update) functions for at least a part of the external electronic device (e.g., the electronic device 104) that is communicating with the electronic device 101 (e.g., turning on/off the external electronic device itself (or some elements thereof) or adjusting the brightness (or resolution) of a display), applications operating in the external electronic device, or services (e.g., a telephone call service or a message service) provided from the external electronic device. According to various embodiments of the disclosure, the application 134 may include an application designated according to attributes (for example, the type of the electronic apparatus) of a particular external electronic device (for example, the electronic device 102 or electronic device 104). For example, when the external electronic device is an MP3 player, the applications 134 may include an application related to the playback of music. Similarly, when the external electronic device is a mobile medical appliance, the applications 134 may include an application related to health care, and which be diagnostic, preventive, or a combination thereof. According to an embodiment, the applications 134 may include at least one of an application designated to the electronic device 101 and an application received from the external electronic device (for example, a server 106 or the electronic device 104).

With continued reference to FIG. 1, a switching program 135 (or audio data reproduction program) may generate reproduction request data such that media content (e.g., audio data) specified to be reproduced in the electronic device 101 is to be reproduced through at least one other electronic device (for example, electronic device 102, 103), and may transmit the generated reproduction request data to the another specified electronic device (for example, electronic device 102 and 103). In addition, the switching program 135 may transmit reproduction stop request information that stops the reproduction of the media content being reproduced in another electronic device and may control the media content the reproduction of which has stopped in another electronic device to be reproduced continuously in the electronic device 101. According to one embodiment of the disclosure, the switching program 135, in response to the reproduction stop request of the electronic device, may control the audio data to be reproduced continuously from the position where the reproduction has stopped in the another electronic device.

The switching program 135 may determine the audio information to be reproduced in another electronic device and/or output information of another electronic device, and may transmit the determined information as the reproduction request information to the another electronic device. The switching program 135 allows the data identification information of the audio data the reproduction of which has stopped, or is to be stopped, in the electronic device 101 to be included in the audio information.

The switching program 135 allows the identification information of the output device (e.g., that can be realized as an external device, a headset, etc.), which receives and outputs the audio data reproduced and transmitted by the electronic device 101 to be included in the output information. The switching program 135 may be connected with another electronic device through at least one wireless communication, and may transmit the output information through at least one wireless communication.

The switching program 135, when transmitting the reproduction request information, may release the connection with the output device. The switching program 135 may transmit the audio data to be reproduced via the interface with another electronic device. The switching program 135 may stop the reproduction and external output of the audio data of another electronic device and identify the stopped audio information and then continuously reproduces the audio data in the electronic device 101. The switching program 135 may output the reproduced audio data via the output device. The switching program 135 may, in response to an operation of stopping reproduction and external output of the audio data of another electronic device, identify the stopped audio information.

The switching program 135, when performing the above-described operation, may process data which is configured of protocol or instructions promised between the electronic device 101 and another electronic device (for example, electronic device 102). The switching program 135 may be provided by being included in the application 134, or may be stored in the memory 130 as another program.

With continued reference to FIG. 1, the input/output interface 140 may transmit the instructions or data input by the user through input/output device (e.g., various sensors, such as an acceleration sensor, a gyro sensor, and/or device, such as a keyboard or touch screen), for example, via the bus 110, to the processor 120, memory 130 or the communication interface 160. For example, the input/output interface 140 may provide the processor 120 with data corresponding to a touch of the user received as input through a touch screen. Further, the input/output interface 140 may output a command or data, received from, for example, the processor 120, the memory 130, or the communication interface 160 via the bus 110, through an output unit (e.g., speaker or display). For example, the input/output interface 140 may output voice data processed by the processor 120 to the user through a speaker.

The display 150 may display various pieces of information (for example, multimedia data, text data or the like) to a user. Further, the display 150 may include input means, for example, and may be configured with a touch screen for inputting instructions by touching or proximity-touching the display 150.

The communication interface 160 (e.g., the communication module 220) may establish a communication connection between the electronic device 101 and an external device (e.g., the electronic device 104 or the server 106). For example, the communication interface 160 may be connected to the network 162 through wireless communication or wired communication, and may communicate with one or more external devices. The wireless communication may include at least one of, for example, Wi-Fi, Bluetooth (BT), Near Field Communication (NFC), Global Positioning System (GPS) and cellular communication (for example LTE, LTE-A, CDMA, WCDMA, UMTS, WiBro, GSM, etc.). The wired communication may include at least one of, for example, a Universal Serial Bus (USB), a High Definition Multimedia Interface (HDMI), a Recommended Standard 232 (RS-232), and a Plain Old Telephone Service (POTS).

According to an embodiment of the disclosure, the network 162 may be a telecommunications network. The telecommunication network may include at least one of a computer network, the Internet, the Internet of Things, and a telephone network. According to one embodiment, a protocol (e.g., a transport layer protocol, data link layer protocol, or a physical layer protocol) for communication between the electronic device 101 and the external device may be supported by at least one of the application 134, the application programming interface 133, the middleware 132, the kernel 131, and the communication interface 160. When performing communication between the electronic device 101 and the external device, the communication may be performed based on at least one of a Basic Rate (BR) such as a Hand Free Profile (HFP) and a Serial Port Profile (SPP), an Enhanced Data Rate (EDR) communication protocol and a communication protocol, or instructions such as Bluetooth Low Energy (BLE).

According to one embodiment of the disclosure, the server 106 may support the driving of the electronic device 101 by performing at least one operation (or function) implemented in the electronic device 101. For example, the server 106 may include a processor 120 for controlling various embodiments of the present disclosure which will be described later below to be performed in the electronic device 101 and a server module (e.g., a server controller or a server processor, not shown) for supporting the specified particular module to perform various embodiments. For example, the server module includes at least one element of a processor 120 or a specific module, and may perform (for example, acting) at least one operation among the operations of the processor 120 or a specific module.

Figure 2:
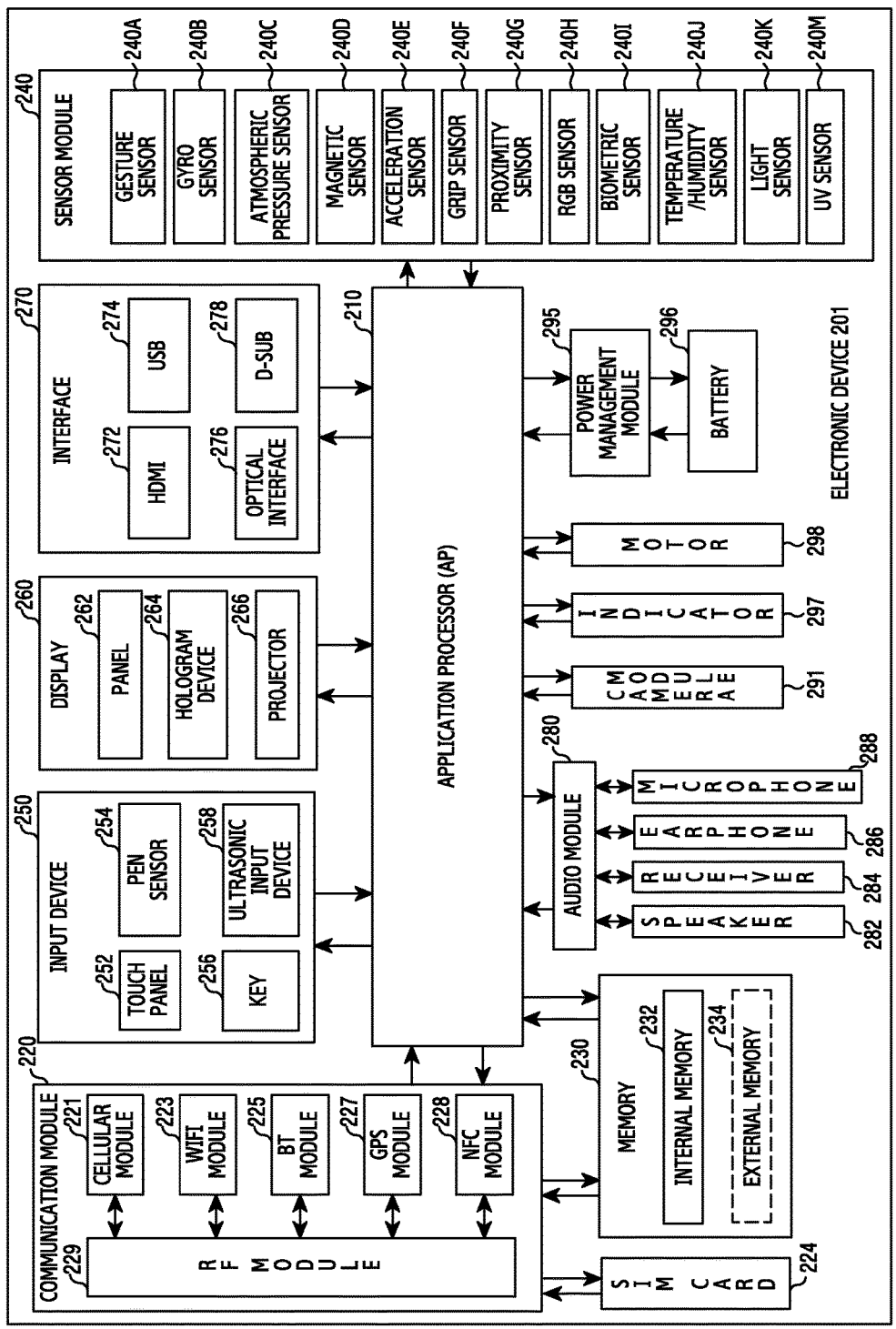
FIG. 2 is a block diagram of an electronic device according to various embodiments of the present disclosure.

FIG. 2 is a block diagram of an electronic device provided to illustrate various embodiments of the present disclosure.

Referring now to FIG. 2, the electronic device 201 may constitute, for example, all or some of the electronic device 101 illustrated in FIG. 1, or expand all or some of the components of the electronic device 101. Referring now to FIG. 2, the electronic device 201 may include at least one processor 210, a communication module 220, a Subscriber Identifier Module (SIM) card 224, a memory 230, a sensor module 240, an input device 250, a display 260, an interface 270, an audio module 280, a camera module 291, a power management module 295, a battery 296, an indicator 297, and a motor 298.

The processor 210 may be included in the electronic device 101 and configured to perform a predetermined function of the electronic device 101. According to an embodiment, the processor 210 may include one or more Application Processors (APs) and one or more Micro Control Unit (MCUs).

According to another embodiment of the disclosure, the processor 210 may include one or more micro control units configured to provide applications or may be functionally-connected to one or more micro control units. In FIG. 2, the AP and the MCU may be included in one IC package, or may be separately configured to be included in different IC packages, respectively.

According to an embodiment of the disclosure, the MCU may be included in an IC package of the AP to be configured as one IC package together with the AP. Although the processor 210 is disclosed herein above as including the AP or the MCU, such a configuration is provided for illustrative purposes to aid in understanding, but a person of ordinary skill in the art that the processor 210 may also perform operations of the AP and/or the MCU.

The AP may drive an operating system or an application program so as to control a plurality of hardware or software components configured for operation with the AP, and may process various pieces of data including multimedia data and perform calculations. The AP may be implemented by, for example, a System on Chip (SoC). According to an embodiment, the processor 210 may further include a Graphic Processing Unit (GPU) (not illustrated).

The MCU may be a processor configured to perform a predetermined operation. According to an embodiment, the MCU may acquire sensing information through one or more predetermined motion sensors (for example, a gyro sensor 240B, an acceleration sensor 240E, or a geomagnetic sensor (not illustrated)), compare acquired sensing information, and determine an operation state of the predetermined sensor (for example, the geomagnetic sensor) with reference to a database of the electronic device 201. Further, although the MCU and the components of the sensor module 240 are illustrated as separate components in FIG. 2, the MCU may be implemented to include at least some of the components of the sensor module 240 (for example, at least one of the gyro sensor 240B, the acceleration sensor 240E, and the geomagnetic sensor).

According to an embodiment, the AP or the MCU may load a command or data received from at least one of a non-volatile memory and other components connected to each of the AP and the MCU in a volatile memory, and may process the loaded command or data. Further, the AP or the MCU may store data received from or generated by at least one of the other components in a non-volatile memory.

A communication module 220 (for example, a communication interface 160) may transmit and receive data in communication between the electronic device 101 and other electronic devices that are connected via the network (for example, an electronic device 102, an electronic device 104 or a server 106). According to an embodiment, the communication module 220 may include a cellular module 221, a Wi-Fi module 223, a BT module 225, a GPS module 227, an NFC module 228, and a Wireless Frequency (RF) module 229.

The cellular module 221 may be configured to provide a voice, a call, a video call, a text message service, or an Internet service through a communication network (for example, Long Term Evolution (LTE), LTE-A, Code Division Multiple Access (CDMA), Wideband CDMA (WCDMA), Universal Mobile Telecommunication System (UMTS), Wireless Broadband (WiBro), or Global System for Mobile communication (GSM)). Furthermore, the cellular module 221 may distinguish between and authenticate electronic devices within a communication network by using, for example, a subscriber identification module (for example, the SIM card 224). According to an embodiment, the cellular module 221 may perform at least some of the functions which the AP 210 may provide. For example, the cellular module 221 may perform at least some of the multimedia control functions.

According to another embodiment of the present disclosure, the cellular module 221 may include a Communication Processor (CP). Furthermore, the cellular module 221 may be implemented by, for example, an SoC. In FIG. 2, the elements such as the cellular phone module 221 (e.g., a communication processor), the memory 230 or the power management module 295 are shown as separate elements from the AP 210, however, according to an embodiment, the AP 210 can be implemented to include at least a part (e.g., the cellular phone module 221) among the elements described above.

According to an embodiment of the present disclosure, the AP 210 or the cellular module 221 (for example, the communication processor) may load a command or data received from at least one of a non-volatile memory and other components connected thereto into a volatile memory and process the loaded command or data. Further, the AP 210 or the cellular module 221 may store data received from or generated by at least one of other components in a non-volatile memory.

For example, each of the Wi-Fi module 223, the BT module 225, the GPS module 227, and the NFC module 228 may include a processor for processing data transmitted/received through the corresponding module. Although the cellular module 221, the WiFi module 223, the BT module 225, the GPS module 227, and the NFC module 228 are illustrated as separate blocks in FIG. 2, at least some (for example, two or more) of the cellular module 221, the WiFi module 223, the BT module 225, the GPS module 227, and the NFC module 228 may be included in one Integrated Chip (IC) or one IC package in one embodiment. For example, at least some (for example, the communication processor corresponding to the cellular module 221 and the WiFi processor corresponding to the WiFi module 223) of the processors corresponding to the cellular module 221, the WiFi module 223, the BT module 225, the GPS module 227, and the NFC module 228 may be implemented as one SoC.

The RF module 229 may transmit/receive data, for example, RF signals. Although not illustrated in the drawing, the RF module 229 may, for example, include a transceiver, a Power Amp Module (PAM), a frequency filter, a Low Noise Amplifier (LNA), or the like. Further, the RF module 229 may further include a component for transmitting/receiving electronic waves over a free air space in wireless communication, for example, a conductor, a conducting wire or the like. Although the cellular module 221, the Wi-Fi module 223, the BT module 225, the GPS module 227, and the NFC module 228 share one RF module 829 in FIG. 2, at least one of them may transmit/receive an RF signal through a separate RF module according to one embodiment.

The Subscriber Identification Module (SIM) card 224 may be a card including a subscriber identification module, and may be inserted into a slot formed in a predetermined portion of the electronic device. The SIM card 224 may include unique identification information (for example, an integrated circuit card identifier (ICCID)) or subscriber information (for example, an international mobile subscriber identity (IMSI)).

The memory 230 (for example, the memory 130) may include an internal memory 232 or an external memory 234. The internal memory 232 may include at least one of a volatile memory (for example, a Dynamic Random Access Memory (DRAM), a Static RAM (SRAM), a Synchronous Dynamic RAM (SDRAM), or the like) or a non-volatile memory (for example, a One Time Programmable Read Only Memory (OTPROM), a Programmable ROM (PROM), an Erasable and Programmable ROM (EPROM), an Electrically Erasable and Programmable ROM (EEPROM), a mask ROM, a flash ROM, a NAND flash memory, a NOR flash memory, or the like).

According to an embodiment, the internal memory 232 may be a Solid State Drive (SSD). The external memory 234 may further include a flash drive, for example, a Compact Flash (CF), a Secure Digital (SD), a Micro Secure Digital (Micro-SD), a Mini Secure Digital (Mini-SD), an extreme Digital (xD), a memory stick, or the like. The external memory 234 may be functionally connected to the electronic device 201 through various interfaces. According to an embodiment, the electronic device 201 may further include a storage device (or storage medium) such as a hard drive.

The sensor module 240 measures a particular physical quantity or senses an operational state of the electronic device 201, and converts the measured or sensed information into an electric signal. The sensor module 240 may, for example, include at least one of a gesture sensor 240A, a gyro sensor 240B, a barometric pressure sensor 240C, a magnetic sensor 240D, an acceleration sensor 240E, grip sensor 240F, proximity sensor 240G, a color sensor 240H (for example, RGB (red, green, blue) sensor), a biometric sensor 240I, a temperature/humidity sensor 240J, an illuminance sensor 240K or an ultra violet (UV) sensor 240M. Additionally or alternatively, the sensor module 240 may, for example, include an E-nose sensor (not shown), an electromyography (EMG) sensor (not shown), an electroencephalogram (EEG) sensor (not shown), an electrocardiogram (ECG) sensor (not shown), an Infrared (IR) sensor (not shown), an iris sensor (not shown), a fingerprint sensor (not shown), and the like. The sensor module 240 may further include a control circuit for controlling one or more sensors included therein. Thus, the constitution of the sensor is quite varied, and the above physical quantities being measured is only representative of the many different types of physical quantities that can be measured.

The input device 250 may include a touch panel 252, a (digital) pen sensor 254, a key 256, or an ultrasonic input device 258. The touch panel 252 may recognize a touch input in at least one of, for example, a capacitive type, a resistive type, an infrared type, and an acoustic wave type. The touch panel 252 may further include a control circuit. The capacitive type touch panel may detect a physical contact or proximity. The touch panel 252 may further include a tactile layer. In the case of a tactile layer, the touch panel 252 may provide a user with a tactile reaction.

The (digital) pen sensor 254 may be implemented by, for example, using a method identical or similar to a method of receiving a touch input of a user, or using a separate recognition sheet. The key 256 may include, for example, a physical button, an optical key, or a keypad. The ultrasonic input device 258 is a device which may identify data by detecting an acoustic wave with a microphone (for example, a microphone 288) of the electronic device 201 through an input tool generating an ultrasonic signal, and may perform wireless detection. According to an embodiment, the electronic device 201 may also receive a user's input from an external device (for example, a computer or server) connected thereto by using the communication module 220.

The display 260 (for example, the display 150) may include a panel 262, a hologram device 264, or a projector 266. For example, the panel 262 may be, for example, a Liquid Crystal Display (LCD), an Active Matrix Organic Light Emitting Diode (AM-OLED), or the like. The panel 262 may be implemented to be, for example, flexible, transparent, or wearable. The panel 262 may be implemented by a single module together with the touch panel 252. The hologram device 264 may show a three dimensional image in the air by using an interference of light. The projector 266 may display an image by projecting light onto a screen. The screen may be located, for example, inside or outside the electronic device 201. The screen may also be curved. According to an embodiment, the display 260 may further include a control circuit for controlling the panel 262, the hologram device 264, or the projector 266.

The interface 270 may include, for example, a High-Definition Multimedia Interface (HDMI) 272, a Universal Serial Bus (USB) 274, an optical interface 276, or a D-sub-miniature (D-sub) 278. The interface 270 may be included in, for example, the communication interface 160 illustrated in FIG. 1. Additionally or alternatively, the interface 270 may include, for example, a Mobile High-definition Link (MHL) interface, a Secure Digital (SD) card/Multi-Media Card (MMC) interface, or an Infrared Data Association (IrDA) standard interface.

The audio module 280, which is a codec, may bidirectionally convert a sound and an electrical signal. At least some components of the audio module 280 may be included in, for example, the input/output interface 140 illustrated in FIG. 1. The audio module 280 may process voice information input or output through, for example, a speaker 282, a receiver 284, an earphone 286, or the microphone 288.

The camera module 291 is a device that may photograph still and/or moving images, and may include one or more image sensors (for example, a front sensor or a rear sensor, not shown), a lens (not shown), an image signal processor (ISP) (not shown), or a flash (for example, an LED or a xenon lamp, not shown) according to an embodiment.

The power management module 295 provides for managing the power of the electronic device 201. Although not illustrated, the power management module 295 may include, for example, a Power Management Integrated Circuit (PMIC), a charger Integrated Circuit (IC), or a battery or fuel gauge. According to various embodiments, the PMIC may be mounted in the integrated circuit or SoC semiconductor. Charging methods may be classified into a wired charging method and a wireless charging method. The charger IC may charge a battery and may prevent an overvoltage or excess current from being induced or from flowing from a charger. According to an embodiment, the charger IC may include a charger IC for at least one of the wired charging method and the wireless charging method. Examples of the wireless charging may include magnetic resonance charging, magnetic induction charging, and electromagnetic charging, and an additional circuit such as a coil loop, a resonance circuit, and a rectifier may be added for the wireless charging.

The battery gauge may measure, for example, a residual quantity of the battery 296, and a voltage, a current, or a temperature during the charging. The battery 296 may store or generate electricity and may supply power to the electronic device 201 using the stored or generated electricity. The battery 296 may include, for example, a rechargeable battery or a solar battery.

With continued reference to FIG. 2, the indicator 297 may display a specific state of the electronic device 201 or a part thereof (e.g., the AP 210), for example, a boot-up state, a message state, or a state of charge (SOC). A motor 298 may convert an electrical signal into a mechanical vibration. Although not illustrated, the electronic device 201 may include a processing device (for example, a GPU) for supporting mobile TV. The processing unit for supporting mobile TV may process, for example, media data pursuant to a certain standard of Digital Multimedia Broadcasting (DMB), Digital Video Broadcasting (DVB), or media flow. Media or media data mentioned in various embodiments of the present disclosure may be various pieces of data including audio contents such as a sound source or a movie. Further, in the following description, the represented audio or audio data indicates the data containing the audio component, but are not limited thereto, and may be applied to the media content or media data including audio and/or video.

Each of the above described elements of the electronic device according to various embodiments of the present disclosure may include one or more components, and the name of a corresponding element may vary according to the type of electronic device. The electronic device according to various embodiments of the present disclosure may include at least one of the above described elements and may exclude some of the elements or further include other additional elements. Further, some of the elements of the electronic device according to various embodiments of the present disclosure may be coupled to form a single entity while performing the same or similar functions as those of the corresponding elements before the coupling.

Furthermore, the electronic device 102, the electronic device 103 and/or the electronic device 104, according to various embodiments of the present disclosure, may include the configuration that is the same as or similar to the electronic device 201 (or the electronic device 101). In addition, the electronic device 102, the electronic device 103 and/or the electronic device 104 may be configured to include at least a part of the electronic device 201 (or the electronic device 101). The electronic device 102, the electronic device 103 and/or the electronic device 104, while connected to the electronic device 201 (or the electronic device 101) using a network communication (or wireless communication), may perform a function corresponding to data transmitting to or receiving from the electronic device 201 (or the electronic device 101). In the following description, as far as not being described with a particular distinction, the first electronic device may refer to the electronic device 101, the second electronic device the electronic device 102 and the third electronic device the electronic device 103 (or output device). In addition, at least one of the devices can be a device that supports Advanced Auto Distribution Profile Sink (A2DP).

As described above, in accordance with various embodiments of the present disclosure, an electronic device may include: a communication interface; a display; and a processor connected functionally to the communication interface and the display, wherein the processor may be configured to include: outputting an audio data that is reproduced through an output device connected thereto; detecting a user's input for a device change; generating a reproduction request information including at least one of audio information and the output information corresponding to the audio data; and controlling transmitting of the reproduction request information to another electronic device connectable to the output device. In various embodiments of the present disclosure, the reproduction request information is transmitted to the other electronic device connected to the electronic device and may include information for requesting the other electronic device connection with the output device and information for requesting to output audio sound of audio data through the output device by reproducing the audio data based on the audio information. In various embodiments of the present disclosure, the audio information may include data identification information of the audio data being reproduced in the electronic device or the reproduction is to be stopped, and the output information may include device identification information of the output device which outputs the audio sound reproduced and transmitted in the electronic device.

In various embodiments of the disclosure, the processor, when controlling transmitting the reproduction request information, can process a release of the connection with the output device and control transmission of the audio data to be reproduced in the another electronic device through the communication interface.

In various embodiments of the present disclosure, the processor is configured to control connection with the another electronic device with the output device according to the reproduction request information and to reproduce the audio data by the another electronic device based on the reproduction request information, and to output the audio data through the output device. In various embodiments of the disclosure, the processor can control the reproduction of the audio data of the other electronic device to stop; and identify the received audio information when the audio information on the audio data is received from the other electronic device, and to execute continuous reproduction of the audio data in the electronic device. In various embodiments of the present disclosure, the processor can process to reproduce the audio data from the position where the reproduction has stopped in the another electronic device and to output the audio data through the output device.

In various embodiments of the present disclosure, the processor may be configured to process operations, and in which the operations include detecting a user's input for a change of a device; transmitting a reproduction stop request information for stopping the reproduction of the audio data to another electronic device connected thereto; receiving reproduction stop information corresponding to the reproduction stop request information from the another electronic device; connecting to the output device based on the reproduction stop information; and reproducing the audio data based on the reproduction stop information and outputting the audio data via the output device.

Figure 3:
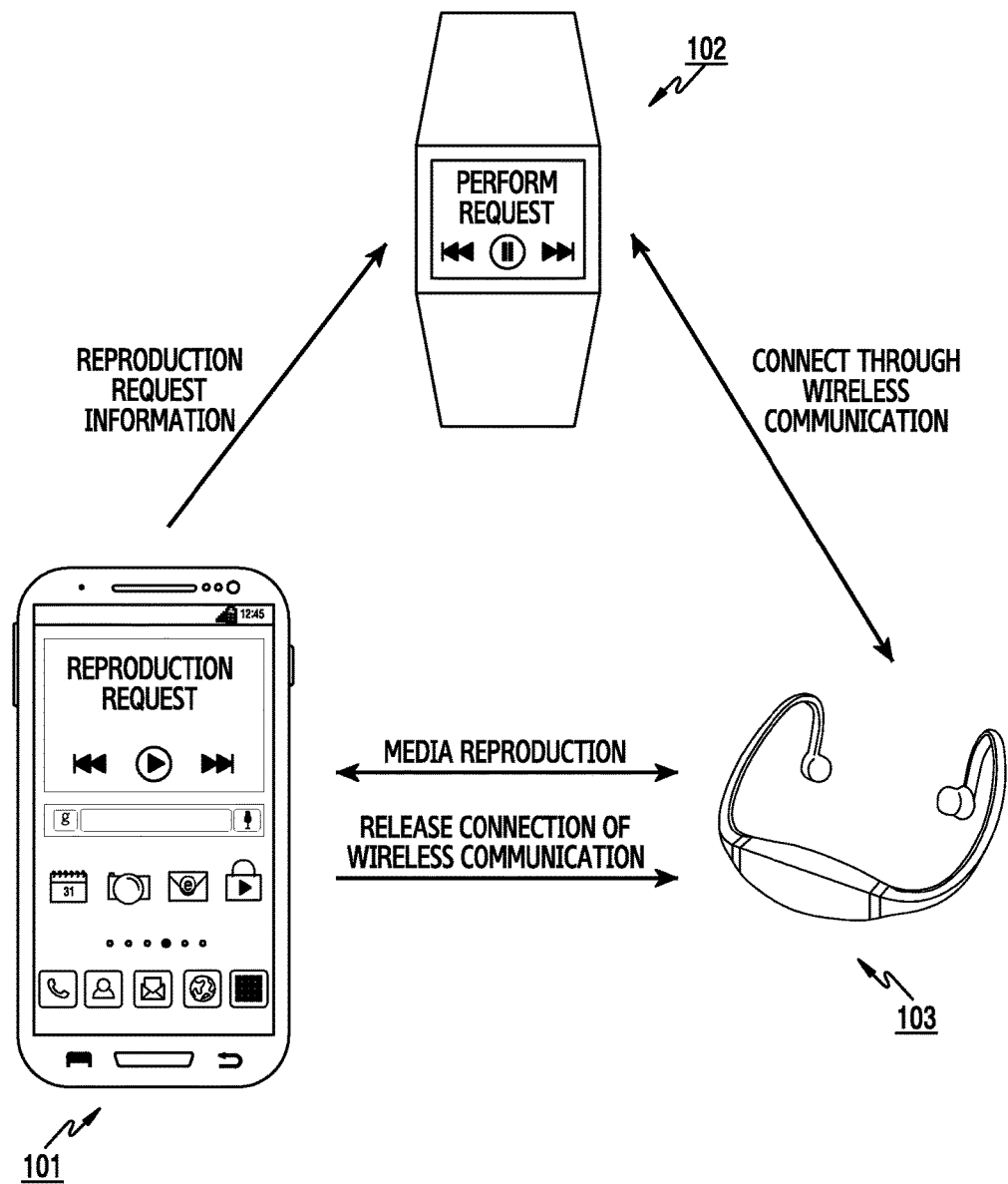
FIG. 3 is a network configuration diagram of controlling a connection with an output device connected wirelessly in an electronic device according to various embodiments of the present disclosure.

FIG. 3 is a network configuration diagram for controlling a connection with a third electronic device connected wirelessly to a first electronic device or a second electronic device according to various embodiments of the present disclosure.

According to various embodiments of the present disclosure, the first electronic device 101 may refer to a portable terminal (for example, smart phones, MP3 players, etc.), the second electronic device 102 may refer to a wearable device, and a third electronic device 103 may refer to an output device (for example, a headset, a speaker, an earphone) for receiving and outputting the audio data reproduced in the electronic device 101 or the second electronic device 102.

According to various embodiments, the first electronic device 101, based on a user's input, allows the second electronic device 102 to transmit data controlling a specified function to be performed by connecting the electronic device 103 (for example, a headset) connected wirelessly to the output device 101. For example, the first electronic device 101 or the second electronic device 102 may be connected to at least one of the third electronic device 103, and may output the audio sound of the audio data specified in the first electronic device 101 or the second electronic device 102 through the third electronic device 103. In here, the third electronic device 103 may be an output device capable of outputting audio sounds, such as a speaker, an earphone, and a headset or a device with one of the aforementioned transducers to output sound. In various embodiments, the third electronic device 103 (hereinafter, the output device 103), connected to the first electronic device 101 or the second electronic device 102 in wireless communication (e.g., wireless communication such as Bluetooth, Wifi), may output audio data received from the first electronic device 101 or the second electronic device 102.

In various embodiments of the present disclosure, as illustrated in FIGS. 3 to 8, a device that is represented by a headset shows one example of the output device 103 but is not limited to the example of the headset, as described above, may apparently be replaced as an output device such as an earphone or a speaker.

According to various embodiments, the first electronic device 101 and the second electronic device 102 may share a list of audio data contained in each of the devices (e.g., a synchronized state), or share a list of audio information which can be reproduced in the first electronic device 101 or the second electronic device 102, which in the example in FIG. 3 is a wearable device but is not limited to such an example, by connecting to at least one other electronic device. According to one embodiment, the first electronic device 101, when reproducing the audio data, may transmit data such as a list of the audio data specified to be reproduced, the audio information being reproduced, and information and the like of the output device 103 (e.g., at least one of an earphone connected to the first electronic device 101 through wired communication, a headset connected through wired communication and a headset connected in wireless communication) for outputting audio sound to the second electronic device 102. The first electronic device 101 may transmit the above information including the information of the first electronic device 101 to the second electronic device 102.

Further, the first electronic device 101 may receive the transmitted list of the audio data specified to be reproduced in the second electronic device 102, the audio information being reproduced, and information and the like of the output device 103 (e.g., at least one of an earphone connected to the second electronic device 102 through wired communication, a headset connected through wired communication and a headset connected through wireless communication) for outputting audio sound from the second electronic device 102.

According to various embodiments, the first electronic device 101 may synchronize a list of audio data specified to be reproduced based on the user's selection or based on a synchronization point that has been set on the first electronic device 101 and/or the second electronic device 102 (e.g., reproduction time point of the audio data, or user's setting point). When at least one of the first electronic device 101 or the second electronic device 102 is reproducing audio data, the audio information being reproduced, information and the like of the output device 103 for outputting the audio sound may be synchronized. Further, the electronic device 101 and/or electronic device 102 may transmit or receive the status information of the device (e.g., information on the status or mode of the electronic device such as a standby mode, a sleep mode, a reproduction mode of the audio data). It should also be appreciated that the electronic device may be reproducing multimedia data and the devices are not limited to audio reproduction.

Referring again to FIG. 3, the first electronic device 101, in a state of connecting with the output device 103 through wireless communication (e.g., Bluetooth communication, Wi-Fi communication, etc.), may output the audio data which is being reproduced in the first electronic device 101 to the output device 103. The first electronic device 101 may determine a device (for example, a target device that outputs audio data through the output device 103) for reproducing the audio data through the output device 103 based on the user's input, as a second electronic device 102. In various embodiments, the user's input, in a state where the first electronic device 101 (or the second electronic device 102) is connected to the output device 103, may include an input that controls by changing a device for reproducing audio data from a currently connected device (for example, the first electronic device 101) to another device (for example, the second electronic device 102).

When the first electronic device 101 changes the device for outputting the audio data based on the user's input, the first device 101 transmits the reproduction request information to the second electronic device 102. While transmitting the reproduction request information to the second electronic device 102, the first electronic device 101 may also transmit the reproduction request information along with the operation for releasing the connection between the first electronic device 101 and output device 103, or in the disconnected state from the output device 103.

In various embodiments, the reproduction request information that is transmitted to another electronic device (e.g., the second electronic device 102) connected to the electronic device (e.g., the first electronic device 101) may include information that requests the another electronic device connection with the output device 103 and information that requests to output audio sound of audio data through the output device 103 by reproducing the audio data based on the audio information. According to an embodiment, the reproduction request information transmitted to the second electronic device 102 by the first electronic device 101 may include device identification information of the output device 103 that receives and outputs an audio sound of the audio data reproduced in the first electronic device 101, and/or the audio information being reproduced in the first electronic device 101. In various embodiments, the reproduction request information may allow another electronic device (for example, the second electronic device 102) that receives from the first electronic device 101 the reproduction request information to reproduce the corresponding audio data on the basis of the audio information, and may include information that requests an output of audio sound of the audio data corresponding to the device identification information that is being reproduced via the output device 103.

The first electronic device 101, when transmitting the reproduction request information including audio information, may transmit the audio data corresponding to the audio information together. Further, the audio information is not limited to the information corresponding to the audio data included in the first electronic device 101 or the second electronic device 102, but the audio information of the audio data included in another electronic device (e.g., the server 106), and may constitute an address of a streaming service. In various embodiments, the audio information may include data identification information of the audio data being reproduced in the first electronic device 101, and data identification information of the audio data the reproduction of which has stopped or is to be stopped in response to the reproduction request information transmission. Further, the first electronic device 101 may transmit to the second electronic device 102 the control command which allows the second electronic device 102 to connect with the output device 103 and to output the audio sound of the specified audio data through the output device 103, the control command being included in the reproduction request information. Or, the first electronic device 101 may transmit the control command to the second electronic device 102 along with the reproduction request information.

The second electronic device 102 may be connected to the output device 103 based on the reproduction request information and/or the control command received from the first electronic device 101. According to one embodiment, the electronic device 102 may be in a "connection established state" (for example, pairing) with the output device 103. When the second electronic device 102 is connected to the output device 103, the second electronic device 102 may reproduce the specified audio data based on the received reproduction request information. The second electronic device 102 may be controlled to output the reproduced audio data through the output device 103 connected thereto.

When the second electronic device 102 is not receiving the audio information or audio data from the first electronic device 101, the specified audio data may be reproduced in the second electronic device 102. According to one embodiment, the second electronic device 102 may reproduce the audio data reproduced recently by the second electronic device 102. Or, the second electronic device 102, based on the configured information of the second electronic device 102, may reproduce audio data that can control so as to output through the output device 103 such as a random reproduction of audio data included in the second electronic device 102. Furthermore, the second electronic device 102 may reproduce (for example, streaming service based reproduce) so as to receive audio data included in the server 106 via another electronic device (e.g., server 106) that is specified in the configured information, and output the audio data through the output device 103.

The output device 103 may be connected to the first electronic device 101 or connected to the second electronic device 102, and output the audio sound of the audio data being reproduced in the particular connected device (for example, the first electronic device 101 or the second electronic device 102). The output device 103, based on the connection request received from the first electronic device 101 or the second electronic device 102, may be connected to the first electronic device 101 or the second electronic device 102 through wireless communication, and may release the connected wireless communication based on the received disconnection request. The output device 103, in connecting with the first electronic device 101 or the second electronic device 102 in a specified wireless communication, may be a state of which at least one connection establishment operation (for example, pairing) has been executed. When the output device 103 is not paired with the first electronic device 101 or the second electronic device 102, then the output device 103 may execute the requested pairing and connection operation on the basis of the reproduction request information received from the relevant electronic device.

According to an embodiment, the first electronic device 101, in a state of outputting the audio sound of the audio data being reproduced through the output device 103 connected through wireless communication, may be controlled so as to output the audio data through the output device 103 by changing the device for reproducing the audio data to the second electronic device 102, based on the user's input. The first electronic device 101 may transmit audio information of audio data being reproduced or the audio data to the second electronic device 102, and the second electronic device 102 may output the specified audio sound via the output device 103, based on the received audio information or audio data. The second electronic device 102, when there is no received audio information and audio data, may reproduce audio data based on the audio data reproduction method configured in the second electronic device 102 and then output the audio data via the output unit 103.

According to various embodiments, the device change can be automatically performed in response to a disconnection between the first electronic device 101 and the output device 103. For example, the first electronic device 101, in a state of connecting with the output device 103 through wireless communication (e.g., Bluetooth communication, Wi-Fi communication, etc.), may output the audio data which is being reproduced in the first electronic device 101 to the output device 103. When the first electronic device 101 detects the disconnection with the output device 103, the first electronic device 101 may automatically determine to change of a device (for example, a target device that outputs audio data through the output device 103) for reproducing the audio data through the output device 103. When the first electronic device 101 determine the device as second electronic device 102 for outputting the audio data according to the disconnection with the output device 103, transmits the reproduction request information to the second electronic device 102. The second electronic device 102 may be automatically attempt to establish connection to the output device 103 based on the reproduction request information.

Figure 4:
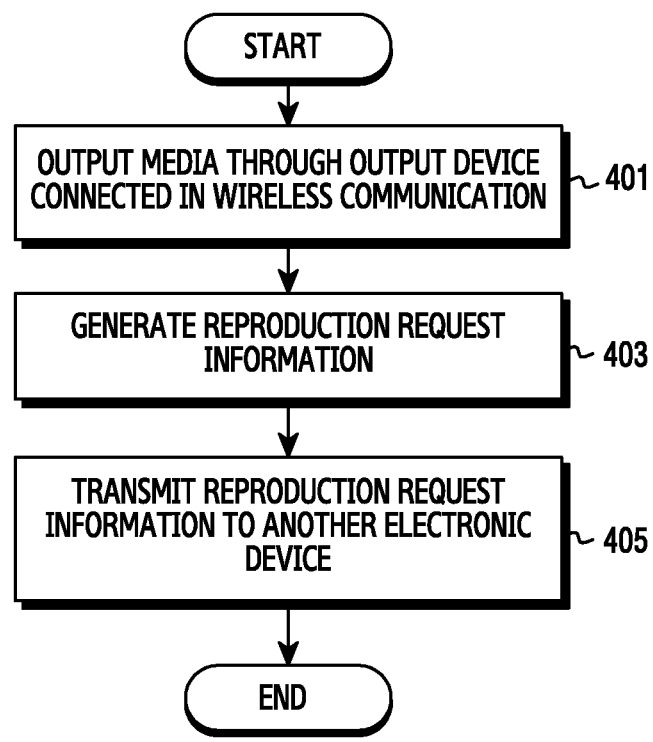
FIG. 4 is a flowchart illustrating an operational example of controlling a device which reproduces audio data to be changed by an electronic device according to various embodiments of the present disclosure.

FIG. 4 is a flowchart illustrating an exemplary operation controlling the change of a device for reproducing audio data by an electronic device according to various embodiments of the present disclosure.

Referring now to FIG. 4, at operation 401, the electronic device 101 may control the output of an audio sound of audio data reproduced in the electronic device 101 to be output through the output device 103 connected through wireless communication. The audio data reproduced in the electronic device 101 may comprise audio data included in the electronic device 101, or audio data reproduced from another electronic device (e.g., server 106) in a streaming method.

At operation 403, the reproduction request information is generated. The electronic device 101, while connected to the output device 103 and outputting the audio data, may detect a control command for controlling a change of the device used for reproducing the audio data. Based on the input control command, the electronic device 101, may acquire the device identification information of the output device 103 that outputs audio information of the selected audio data (for example, audio data currently being reproduced), the audio data, and the audio sound of the audio data being reproduced. The electronic device 101 may generate reproduction request information based on the acquired information.

In various embodiments, the control command may include a user's input detected in the electronic device 101. According to one embodiment, the electronic device 101 may detect the control command input to change the device for reproducing the audio data, based on a menu selection displayed on the display 150, a physical button input included in the electronic device 101, or a user's voice command that is input into the microphone. Or, the electronic device 101 may detect a control command input to change the device for reproducing the audio data through a given gesture or a motion input to at least one sensor (e.g., an acceleration sensor, a gyro sensor, etc.) included in the electronic device 101.

In various embodiments, the electronic device 101 may determine an object (for example, electronic device 102) to which the reproduction request information is to be transmitted, based on the control command to change the device for reproducing audio data. According to one embodiment, the electronic device 101, when the command constitutes an input to control a change of the device, based on the configured information, the electronic device 101 may change the device for reproducing audio data to the device (e.g., an electronic device 102) specified by the configured information. Or, the electronic device 101 may control the changing of a device for reproducing audio data based on a user's input (for example, a selection of an electronic device to be changed) at the point in time when entering the command that controls changing of the device.

At operation 405, the electronic device 101 may transmit the generated reproduction request information to the specified device. According to an embodiment, the electronic device 101 may transmit the generated reproduction request information to the specified device (for example, electronic device 102) determined in order to reproduce the audio data. The reproduction request information may include information which allows the electronic device 102 to be controlled to connect to the output device 103 based on the device identification information included in the reproduction request information. The reproduction request information may be transmitted by including commands for controlling to reproduce the relevant audio data based on the audio information or audio data, or the reproduction request information and the commands may be independently divided and then transmitted together at the time point of transmission. Or in various embodiments, the first electronic device 101, in transmitting the second information of the reproduction request to the electronic device 102, may perform (along with or sequentially) an operation of releasing the wireless communication of the first electronic device 101 and output device 103.

After operation 405, the first electronic device 101 ends the switching process as output is now being performed by the newly selected output device 103.

Figure 5:
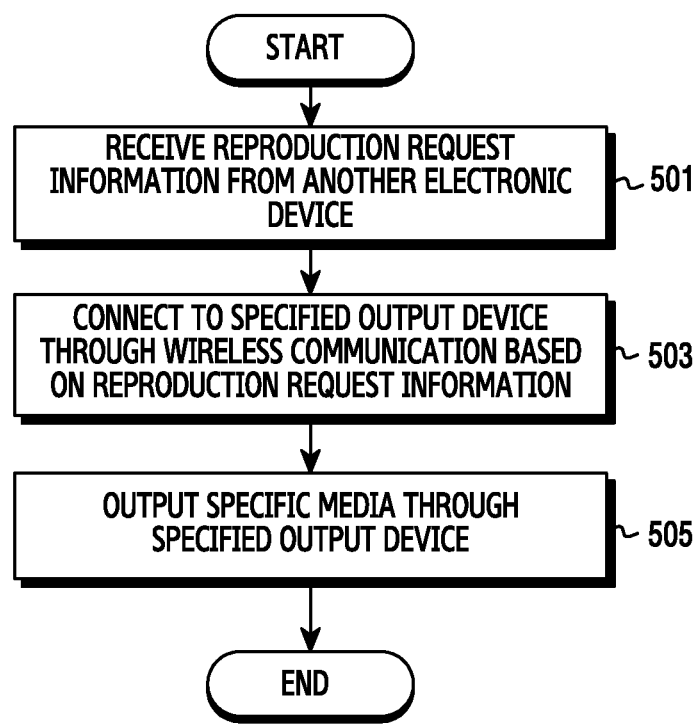
FIG. 5 is a flowchart illustrating an operational of reproducing audio data based on reproduction request information received by an electronic device according to various embodiments of the present disclosure.

FIG. 5 is a flowchart illustrating an operation of reproducing audio data based on reproduction request information received by an electronic device according to various embodiments of the present disclosure.

Referring now to FIG. 5, at operation 501, the electronic device 102 may receive reproduction request information from another electronic device (for example, electronic device 101) connected thereto. The electronic device 102, in receiving the reproduction request information, may receive from at least one device (for example, electronic device 101) connected through wireless communication. In various embodiments, the electronic device 102, at the time point of receiving the reproduction request information, may be executing an operation of at least one of a program (or application) or may be playing audio data.

At operation 503, the electronic device 102 may connect the output device 103 which is specified on the basis of the received reproduction request information through wireless communication at operation 502. According to an embodiment, the electronic device 102 may acquire the device identification information (for example, device identification information of the output device 103) specifying the electronic device 102 to be connected from the received reproduction request information. The electronic device 102 may request the specified wireless communication connection to the output device 103 based on the acquired device identification information.

At operation 505, the electronic device 102 may reproduce the audio data so as to output the specified audio sound through the output device 103 connected thereto, based on the audio information or audio data included in the reproduction request information. According to one embodiment, the electronic device 102 may acquire particular audio information among the received reproduction request information, or may detect the audio data received along with the reproduction request information. The electronic device 102 can reproduce the audio data corresponding to the acquired audio information, and can be controlled so as to output the audio sound of the audio data to be reproduced through the output device 103. The electronic device 102, when receiving the audio data along with the reproduction request information, can reproduce the received audio data and can be controlled to output through the output device 103.

According to one embodiment, when the electronic device 102 may not acquire the audio information in the received reproduction request information, or may not identify the audio data received along with the reproduction request information, the specified audio data can be reproduced based on the configured information of the electronic device 102, and can be controlled to output through an output device 103. According to an embodiment, the electronic device 102 can reproduce the first or last reproduced audio data of a list of audio data (for example, music play lists) on the basis of the configured information, and can be controlled so as to output through the output device 103.

After performing operation 505, the second electronic device 102 may terminate the process.

Figure 6:
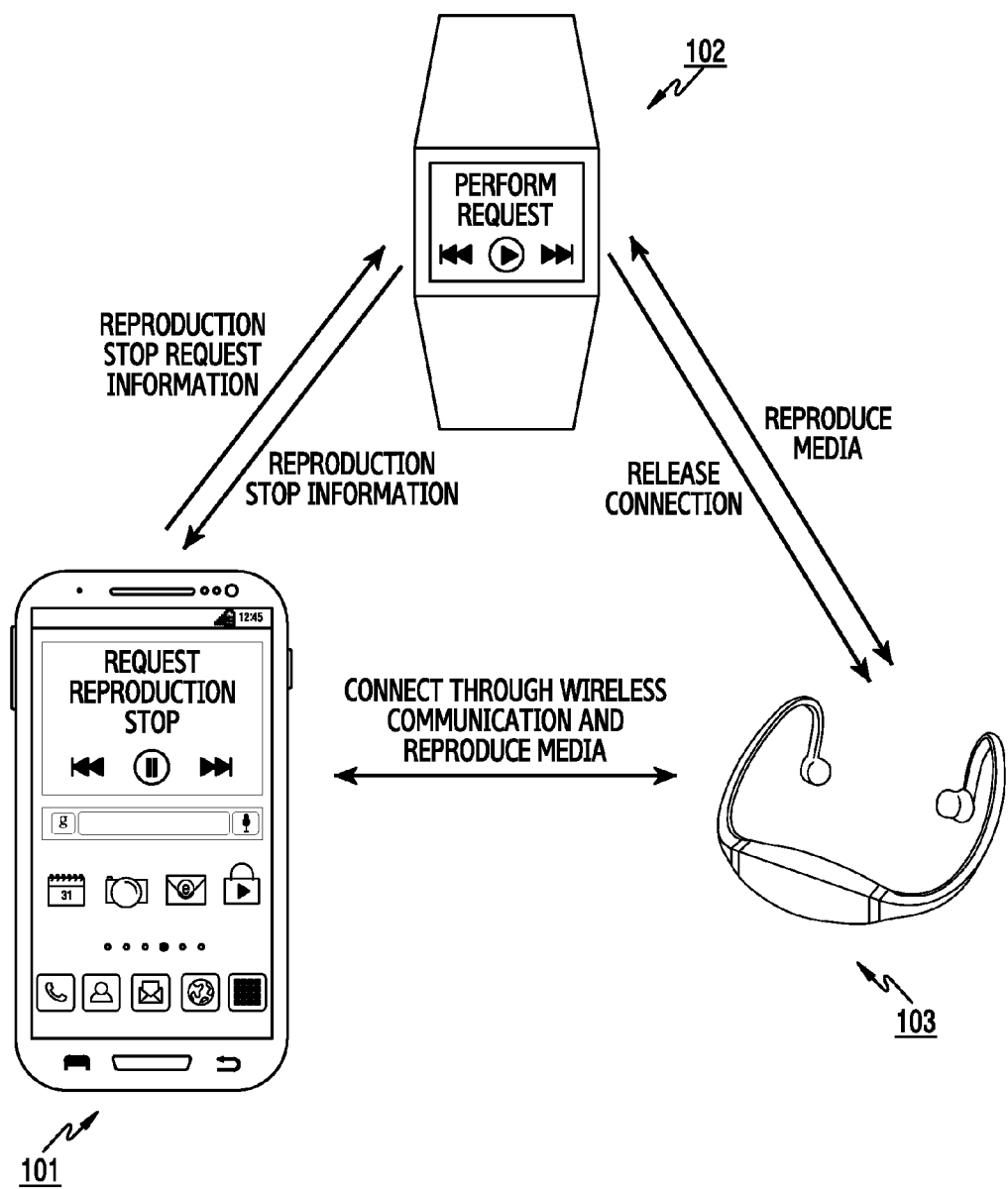
FIG. 6 is a network configuration diagram of controlling a connection with an output device connected wirelessly in an electronic device according to various embodiments of the present disclosure.

FIG. 6 is a network configuration of controlling a connection with a wirelessly connected output device in an electronic device according to various embodiments of the present disclosure.

According to various embodiments, the second electronic device 102 may be controlled by the first electronic device 101 to output the audio sound through the output device 103. The first electronic device 101, based on the input to be detected, may reproduce the same as or similar to audio data being reproduced in the second electronic device 102, and transmit a control command (reproduction stop request information) for outputting through the output device 103 to the electronic device 102.

According to one embodiment, the first electronic device 101 can detect a specified command input from the user. Here, the first electronic device 101 can determine the selection of a menu (for example, provided as an icon or a list on the display 150) for controlling the audio data being reproduced in at least one device (for example, the second electronic device 102) connected through wireless communication so as to be reproduced at the first electronic device 101 through the input specified above. Or, the first electronic device 101 may detect a motion or gesture configured to control the audio data being reproduced in at least one device (for example, the second electronic device 102) connected through wireless communication to be reproduced at the first electronic device 101, or may determine the detection of the selection of the specified button through the input specified above.

The first electronic device 101 may generate reproduction stop request information and transmit the generated reproduction stop information to the second electronic device 102, on the basis of the user's input (e.g., a control command that controls the audio data being reproduced in the second electronic device 102 and/or audio data so as to be reproduced through an output device 103 connected with the second electronic device 102. The first electronic device 101 may determine information requesting at least one from among the device identification information of the output device 103 connected with the specified device (for example, the second electronic device 102), information on audio data being reproduced when the specified device (for example, the second electronic device 102) has been reproducing audio data, and transmission of audio data being reproduced to be the reproduction stop request information.

The first electronic device 101 may receive the reproduction stop information from the second electronic device 102. According to one embodiment, the first electronic device 101 may acquire the audio information or the device identification information of the output device 103 from the received reproduction stop information. The electronic device 101 may request a connection to the output device 103 through wireless communication based on the acquired device identification information. The first electronic device 101 may reproduce the audio data specified based on the audio information included in the reproduction stop information, and control so as to output the audio sounds through the output device 103. The first electronic device 101, when the received reproduction stop information does not include audio information, can reproduce audio data in a manner specified in the configuration information of the first electronic device 101 and can be controlled to output through an output device 103.

The second electronic device 102, while being connected with the output device 103 through wireless communication, may output the audio sound of the audio data. The second electronic device 102 may receive the reproduction stop request information from the first electronic device 101. The second electronic device 102, based on the received reproduction stop request information, may generate reproduction stop information by including at least one of the audio information being reproduced, a list of the audio data configured to be reproduced, device identification information of the output device 103 connected through wireless communication, for outputting the audio data being reproduced in the second electronic device 102. The second electronic device 102 may transmit the generated reproduction stop information to the first electronic device 101.

The second electronic device 102, while transmitting the reproduction stop information, may transmit audio information or audio data associated with the list of audio data included in the reproduction stop information at the same time. The second electronic device 102, while transmitting reproduction stop information to the first electronic device 101, may perform at the same time or sequentially an operation of disconnecting wireless communication with an output device 103 corresponding to the device identification information included in the reproduction stop information. According to an embodiment, the second electronic device 102, while transmitting the reproduction stop information, may transmit the reproduction stop information to the first electronic device 101 in a state of disconnecting the wireless communication with the output device 103.

The output unit 103 is connected to the first electronic device 101 or the second electronic device 102, and then may output an audio sound of the audio data being reproduced at the connected device. The output device 103, based on the connection request received from the first electronic device 101 or the second electronic device 102, may be connected to the first electronic device 101 or the second electronic device 102, and may release the connection of wireless communication based on the communication disconnection request to be received. The output device 103, in connecting with the first electronic device 101 or the second electronic device 102 through specified wireless communication, may be in an execution state where a connection configuration operation (for example, pairing) has been executed one or more times. When the output device 103 is not paired with the first electronic device 101 or the second electronic device 102, then the output device 103 may execute the requested pairing and connection operation in response to the request based on the reproduction request information received by the corresponding electronic device.

According to one embodiment, where the second electronic device 102 is in a state that outputs audio data being reproduced through the output device 103 connected through wireless communication, the first electronic device 101, based on user's input, may change the device for reproducing audio data from the second electronic device 102 to the first electronic device 101, and control the output the audio data via an output device 103 by connecting the first electronic device 101 and the output device 103. The first electronic device 101 may request the second electronic device 102 to transmit the audio information of audio data being reproduced and audio data, and the first electronic device 101 may receive the reproduction stop information which is generated based on the requested information from the second electronic device 102. The first electronic device 101 may output the audio sound through the output device 103, based on the audio information or audio data included in the received reproduction stop information. When there is no audio information and audio data received by the second electronic device 101, the electronic device 101 may reproduce the audio data based on an audio data reproduction method configured in the first electronic device 101 and then output via the output device 103.

Figure 7:
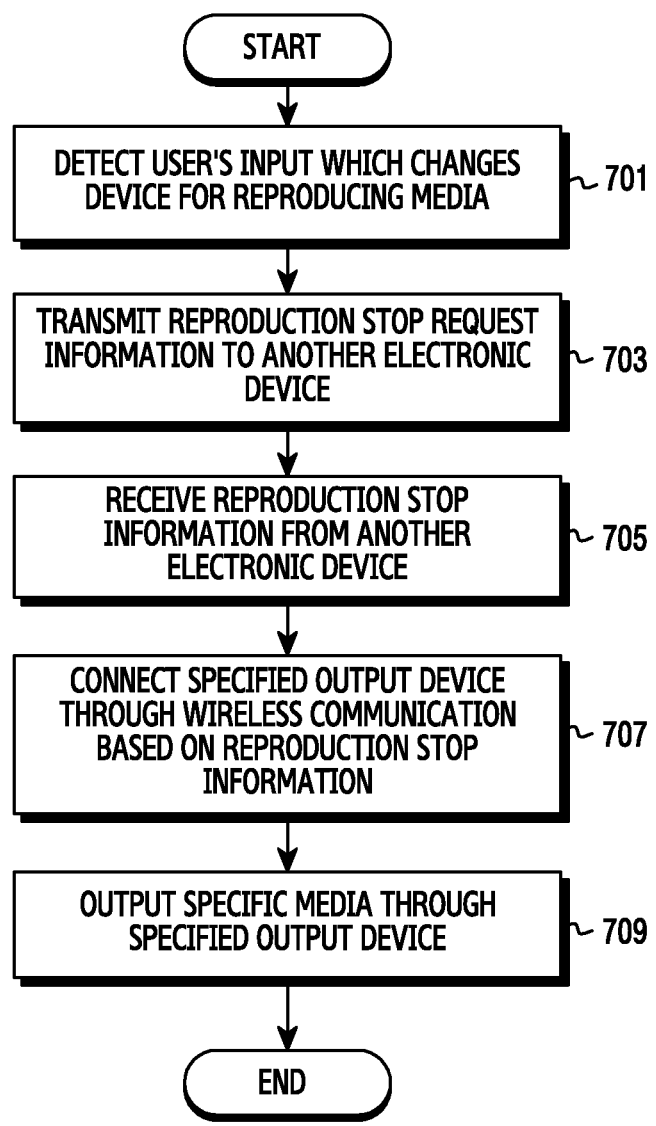
FIG. 7 is a flowchart illustrating an operational example of controlling a device which reproduces audio data to be changed by an electronic device according to various embodiments of the present disclosure.

FIG. 7 is a flowchart illustrating an operation of controlling a device which reproduces audio data to be changed by an electronic device according to various embodiments of the present disclosure.

Referring now to FIG. 7, at operation 701, the first electronic device 101 may detect the user's input for reproducing the audio data by connecting to the output device 103. According to an embodiment, the first electronic device 101, when the user's input is detected, may determine whether connection to the output device 103 is possible. According to an embodiment, the first electronic device 101 may determine whether the connection is possible using a way for identifying a response by requesting a connection through the wireless communication specified to the output device 103. According to various embodiments, the user's input detected by the first electronic device 101 may be a control command that switches a device so as to cause the audio data being reproduced in the second electronic device 102 to be reproduced in the first electronic device 101.

At operation 703, the first electronic device 101 may transmit to the second electronic device 102 the audio information being reproduced in the second electronic device 102, a list of the audio data selected to be reproduced in the second electronic device 102, and reproduction stop request information that requests to transmit information such as the device identification information of the output device 103, in which the output device 103 is connected to the second electronic device 102 through wireless communication, and then outputs audio sound of the audio data reproduced in the second electronic device 102.

At operation 705, the first electronic device 101 may receive the reproduction stop information which is generated based on the reproduction stop request information from the second electronic device 102. The reproduction stop information received by the first electronic device 101 may include audio information being reproduced at the time point of generating the reproduction stop information, from the second electronic device 102, a list of audio data configured to reproduce from the second electronic device 102, and information such as the device identification information of the output device 103 connected through wireless communication in the second electronic device 102.

At operation 707, the first electronic device 101 may be connected to the corresponding output device 103 through a specified wireless communication based on the device identification information included in the reproduction stop information. According to an embodiment, the first electronic device 101 may be in a state of being paired with the output device 103 through Bluetooth communication, and may request a connection to the output device 103 through Bluetooth communication, based on the device identification information included in the reproduction stop information.

At operation 709, the first electronic device 101 may reproduce the specified audio data based on the reproduction stop information and control to output the reproduced audio data through an output device 103 connected thereto. The first electronic device 101, when the reproduction stop information includes a list of audio information or audio data, may reproduce the corresponding audio data. Or, the electronic device 101 may reproduce the audio data by connecting to a server 106 that is specified in the reproduction stop information, or when including the audio information reproduced in a streaming manner, may reproduce the corresponding audio data. The first electronic device 101 may receive audio data along with the reproduction stop information and reproduce the received audio data. The first electronic device 101, while outputting the audio data being reproduced, may output via the output device 103 connected thereto, based on the reproduction stop information.

After performing operation 709, the first electronic device may terminate the process.

Figure 8:
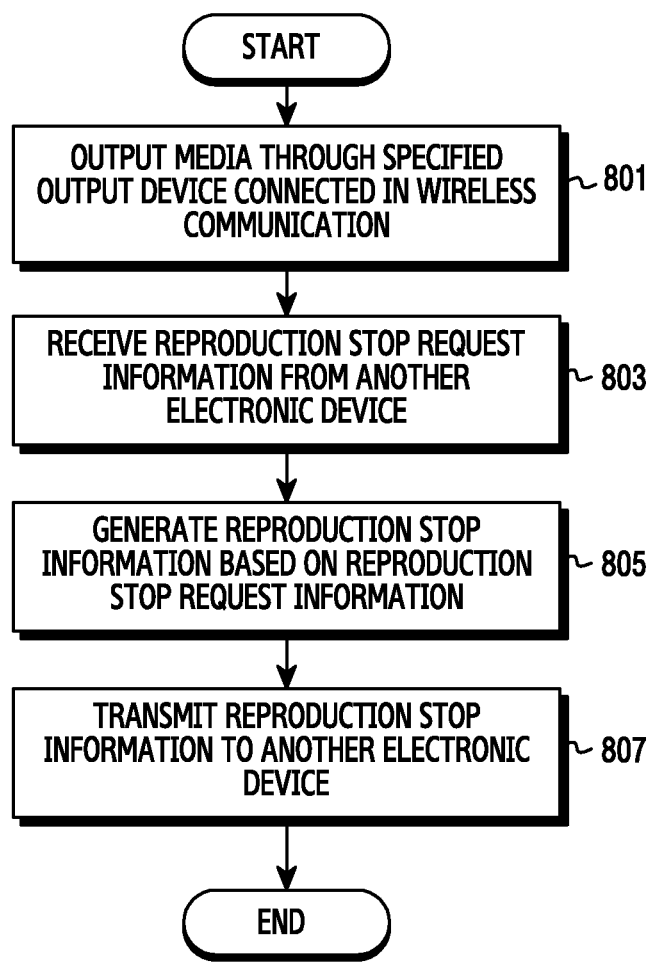
FIG. 8 is a flowchart illustrating an operational example executed by an electronic device based on reproduction stop request information according to various embodiments of the present disclosure.

FIG. 8 is a flowchart illustrating an operation executed by an electronic device based on reproduction stop request information according to various embodiment of the present disclosure.

Referring now to FIG. 8, at operation 801, the electronic device 102 may output audio sound of audio data reproduced in the second electronic device 102 through the output device 103 connected through wireless communication. According to an embodiment, the second electronic device 102 may be in a state of performing the embodiment of FIG. 5 and then outputting the audio data through the output device 103, based on the input detected in the first electronic device 101 connected through wireless communication. According to an embodiment, the second electronic device 102, based on a user's input, may reproduce the audio data included in the second electronic device 102, reproduce audio data included in at least one server 106 connected to the second electronic device 102, and reproduce the audio data on online in a streaming manner. The second electronic device 102 may be controlled so as to output the audio sound of the reproduced audio data through the output device 103.

At operation 803, the second electronic device 102 may receive reproduction stop request information from at least one other electronic device (for example, the first electronic device 101). According to an embodiment, the second electronic device 102, in a state of outputting the audio sound of the reproduced audio data through the output device 103, may receive reproduction stop request information from the first electronic device 101. The reproduction stop request information received by the second electronic device 102 may include information requesting the transmission of at least one among the audio information being reproduced in the second electronic device 102, a list of the audio data configured to be reproduced in the second electronic device 102, device identification information of the output device 103 for outputting audio sound of the audio data reproduced in the second electronic device 102, and audio data reproduced in the second electronic device 102.

At operation 805, the second electronic device 102 may generate the reproduction stop request information in response to the received reproduction stop request information. The second electronic device 102 may generate the reproduction stop information by including at least one among the audio information being reproduced, a list of the audio data configured to be reproduced, and device identification information of the output device 103 for outputting audio sound of the reproduced audio data. According to an embodiment, the second electronic device 102, when reproducing streaming-based audio data, may include addresses of the streaming-based audio data in the reproduction stop information.

At operation 807, the second electronic device 102 may transmit the generated reproduction stop information to the first electronic device 101. According to an embodiment, the second electronic device 102 may transmit the generated reproduction stop information to the first electronic device 101 which has transmitted the reproduction stop request information. In other words, the second electronic device 102 may transmit the reproduction stop information to the first electronic device 101 determined to reproduce the audio data. The reproduction stop information transmitted by the second electronic device 102 allows the first electronic device 101 to be connected to the output device 103 based on the device identification information included in the reproduction stop information and may transmit the corresponding audio data including a promised command (or code) to be reproduced based on the audio information or audio data, or may transmit the reproduction stop information along with the command at the time of transmission but divided independently from each other. In various embodiments, the second electronic device 102, while transmitting reproduction stop information to the first electronic device 101, may perform at the same time or sequentially the operation of disconnecting the wireless communication of the second electronic device 102 and output device 103.

After performing operation 807, the second electronic device 102 may end the process.

As described above, according to an embodiment of the present disclosure, a method for operating an electronic device is provided. The method includes: outputting audio data to be reproduced through an output device connected to the electronic device; detecting a user's input for a device change; generating reproduction request information including at least one of audio information and output information corresponding to the audio data; and transmitting the reproduction request information to another electronic device connectable to the output device. In various embodiments of the present disclosure, the reproduction request information is forwarded to the output device by another electronic device and may include information that requests to output audio sound of audio data through the output device 103 by reproducing the audio data based on the audio information. In various embodiments of the present disclosure, the operation of transmitting may include an operation of releasing a connection with the output device, and may further include an operation of transmitting the audio data to be reproduced in another electronic device.

In various embodiments of the present disclosure, the method may include an operation of connecting the output device in another electronic device based on the reproduction request information, and an operation of reproducing the audio data based on the reproduction request information and outputting through the output device. In various embodiments of the present disclosure, the method may further include an operation of the electronic device controlling stopping the reproduction of the audio data of the another electronic device; an operation of receiving the audio information on the audio data from the another electronic device; and operation of identifying the received audio information and executing continuous reproduction of the audio data in the electronic device. In various embodiments of the present disclosure, the operation of continuous executing may further include an operation of reproducing from the position where the reproduction of the audio data has stopped in another electronic device and outputting through the output device. In various embodiments of the present disclosure, the method may further include an operation of releasing the connection with the output device in another electronic device.

In accordance with various embodiments of the present disclosure, a method for operating an electronic device is provided. The method includes: detecting a user's input for a device change; transmitting reproduction stop request information for stopping reproduction of the audio data to another electronic device connected to the electronic device; receiving the reproduction stop information corresponding to the reproduction stop request information from the another electronic device; connecting to the output device based on the reproduction stop information; and reproducing audio data based on the reproduction stop information and outputting the reproduced audio data via the output device.

Figure 9:
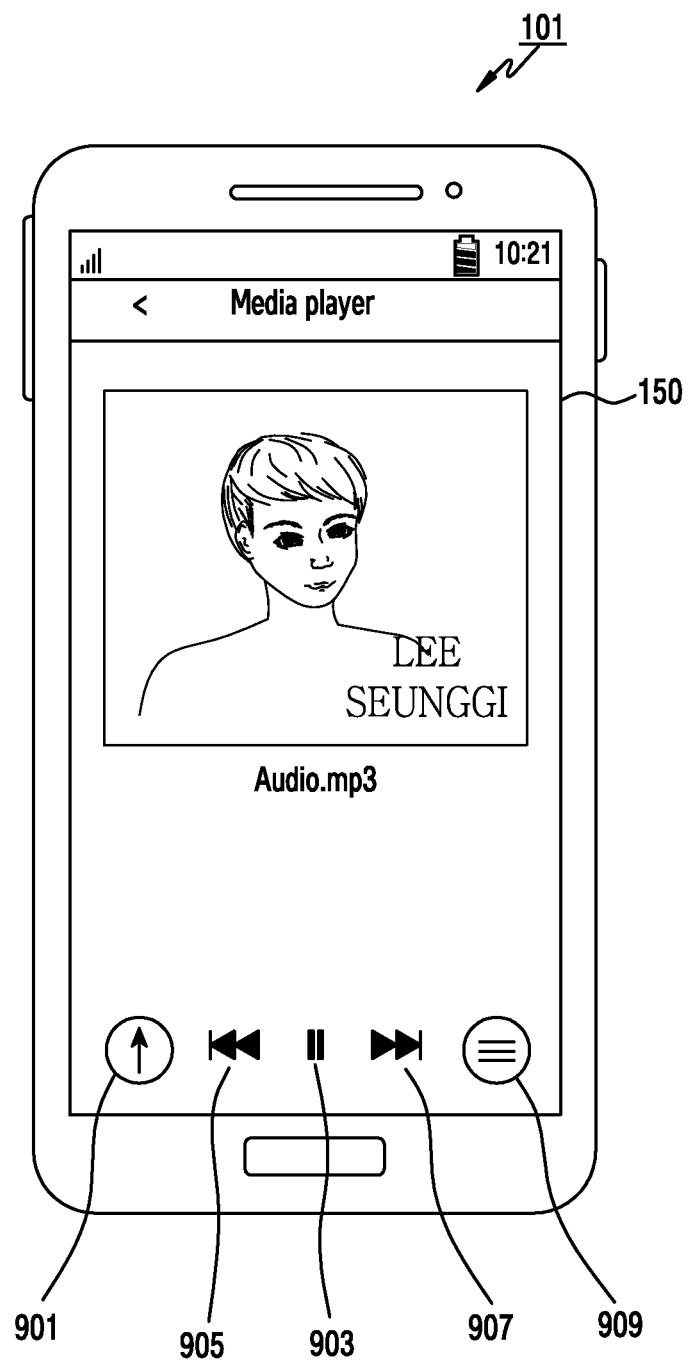
FIG. 9 is a diagram illustrating an operational example of for changing a device for reproducing audio data in an electronic device according to various embodiments of the present disclosure.

FIG. 9 is a diagram illustrating an example of an operation for changing a device for reproducing audio data in an electronic device according to various embodiments.

Referring now to FIG. 9, the electronic device 101, as an embodiment of an operation for changing a device for reproducing audio data, may provide an object (for example, a device change icon 901) of the corresponding function to an area of a reproduce screen of the display 150. According to an embodiment, the electronic device 101 may be provided in a way that displays on the display 150 by including the device change icon 901 in the specified area (for example, a reproduction control area) of the program (not shown) for controlling the reproduction of the audio data. For example, the electronic device 101 may display at least one of an icon 903 that controls the reproduce/stop of the audio data, a back icon 905, a forward icon 907, and a menu icon 909, and the device change icon 901 on the designated position (for example, a reproduction control area) of the display 150 that the program for controlling the reproduction of the audio data is displayed.

According to an embodiment, the electronic device 101, in a state where the audio data is selected by the user, may detect an input for selecting the device change icon 901. In such a case, the electronic device 101 may generate reproduction request information including at least one among audio information of the selected audio data, a list of the audio data configured to be reproduced in electronic devices 101, and device identification information of the output device 103 connected through wireless communication so as to output audio sound of the audio data reproduced in the electronic device 101. The electronic device 101 may transmit the generated reproduction request information to another specified electronic device (for example, electronic device 102).

According to an embodiment, the electronic device 101, in a state where specific audio data is not selected, may detect an input for selecting the device change icon 901. In such a case, the electronic device 101 may generate reproduction request information including at least one from among a list of the audio data and device identification information of the output device 103 connected through wireless communication so as to output audio sound of the audio data reproduced in the electronic device 101, and may transmit the generated reproduction request information to the specified another electronic device (for example, the second electronic device 102).

According to an embodiment, the electronic device 101, while audio data is being reproduced, may detect an input for selecting the device change icon 901. In such a case, the electronic device 101 can generate reproduction request information including audio information corresponding to the audio data being reproduced, and transmit the generated reproduction request information to the specified another electronic device (for example, electronic device 102).

In various embodiments, the electronic device 101, while displaying the device change icon 901, is not limited to display an icon on the display 150, and may provide the icon by including in the menu 909, or provide the icon by a notification bar and a notification window. The electronic device 101 is not limited to the method for changing a device as described above, and may also perform an operation of corresponding to the selection of the device change icon 901 by inputting a voice command specified through the microphone 288. The electronic device 101, while performing an operation of changing the device for reproducing the audio data, may be provided to select another electronic device to be changed.

Figure 10:
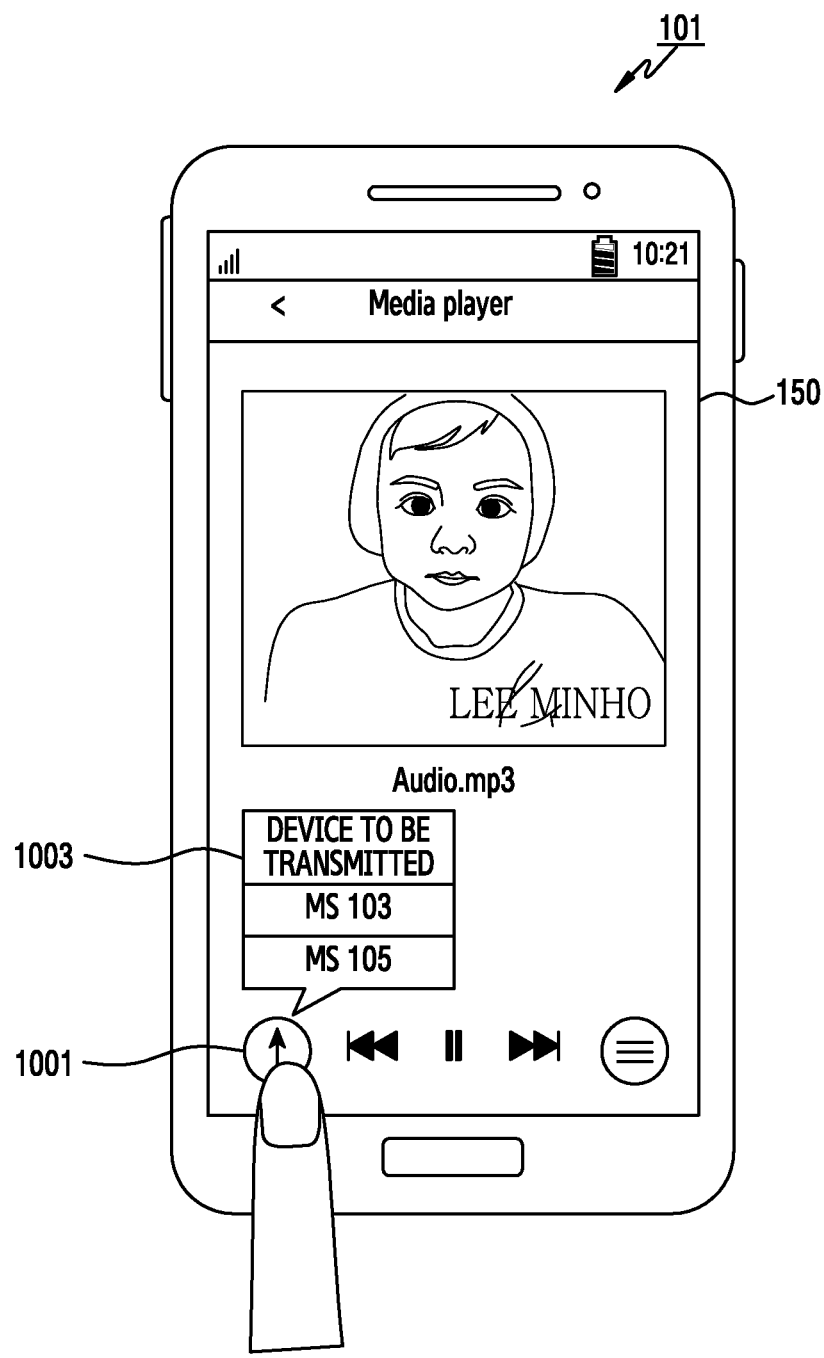
FIG. 10 is a diagram illustrating an operational example of selecting a device to reproduce audio data by connecting to a specified output device in an electronic device according to various embodiments of the present disclosure.

FIG. 10 is a diagram illustrating an example of an operation for selecting a device to reproduce audio data by connecting to a specified output device in the electronic device according to various embodiments.

Referring now to FIG. 10, the electronic device 101 is connected to the output device 103, and may be a state that outputs the audio data being reproduced via the output device 103. In such a state, the electronic device 101 may detect a user's input for selecting a device change icon 1001. When the electronic device 101 detects a user's input by the device change icon 1001, the electronic device 101 may determine to process the reproduction and output of audio data in another electronic device by connecting the output device 103 with the another electronic device. The electronic device 101 may provide a device list 1003 of devices that can select at least one other electronic device (for example, electronic device 102) connectable to the output device 103 in the determining operation.

According to an embodiment, the user may select the device change icon 1001 in order to reproduce the specified audio data in another electronic device and output the reproduced audio data via the output unit 103. The electronic device 101, in response to a user's input for selecting the device change icon 1001, may display the device list 1003 (for example, a device list with respect to at least one device capable of receiving reproduction request information) connectable to the output device 103 on the display 150. The electronic device 101, while providing the device list 1003, may display at least once paired devices (e.g., MS 103, MS 105) through the specified wireless communication. In various embodiments, the electronic device 101, in a state of being connected to the output device 103, when the device is changed from the electronic device 101 to another electronic device, may determine another electronic device capable of receiving the reproduction request information and then provide the device by including in the device list 1003.

According to an embodiment, the electronic device 101, while providing the device list 1003, may also display the device (e.g., including at least one speaker) capable of outputting the audio sound. An embodiment for identifying a device including a speaker in the electronic device 101 may request transmission of the information (for example, device configuration information) that can identify whether the speaker is included in a pairing operation with the electronic device 101, and may determine whether or not the speaker is included based on the received information.

The electronic device 101, in displaying the device change icon 1001, may display the icon 1001 by changing the shape or design of the device change icon 1001 in response to various situations such as a method of changing the device for reproducing the audio data from the electronic device 101 to another electronic device, or a method of changing from another electronic device to the electronic device 101. For example, the device change icon 1001 may be provided in various ways such as currently in a state where the electronic device 101 is connected to the output device 103 and in a state capable of performing a device change from the electronic device 101 to another electronic device. According to an embodiment, as shown in FIG. 10, when it is a state that can make changes in the device to another electronic device from the electronic device 101, an indicator (e.g., arrows) in an upward direction in the device change icon 1001 can be included and provided.

Figure 11:
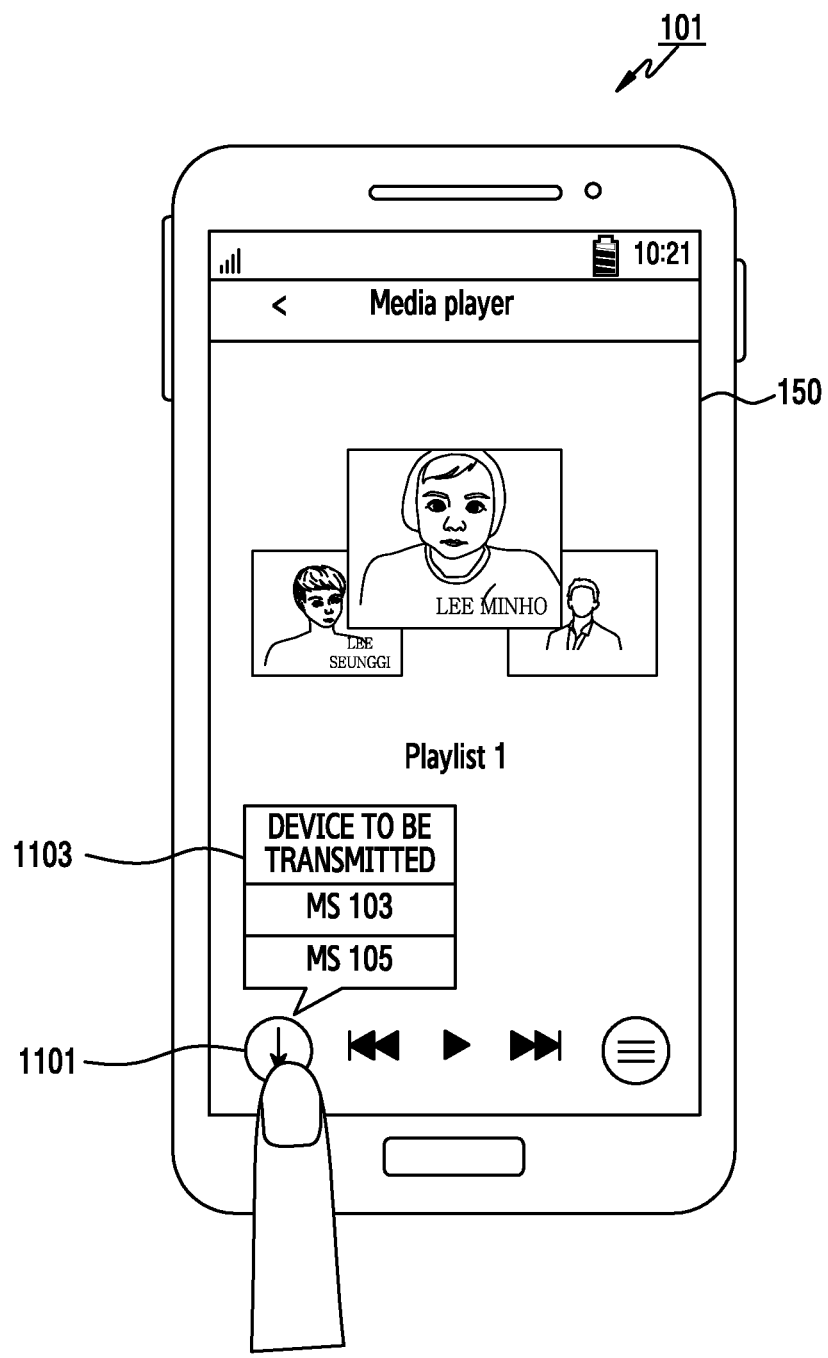
FIG. 11 is a diagram illustrating an operational example of selecting a device to reproduce audio data by connecting to a specified output device in an electronic device according to various embodiments of the present disclosure.

FIG. 11 is a diagram illustrating an example of an operation for selecting a device to reproduce audio data by connecting to a specified output device in the electronic device according to various embodiments of the present disclosure.

Referring now to FIG. 11, there may be illustrated a state where another electronic device (for example, the electronic device 102) is connected to the output device 103, and the audio data being reproduced in another electronic device is output via the output device 103. In such a state, the electronic device 101 may detect a user's input for selecting a device change icon 1101. When the electronic device 101 detects a user's input by the device change icon 1101, the electronic device 101 may determine to process the output of audio data reproduced in the electronic device 101 by connecting the output device 103 connected with the another electronic device. The electronic device 101 may provide the device list 1103 of devices that can select at least one device (for example, electronic device 102) to receive reproduction stop request information in the determining operation.

According to an embodiment, the user may select the device change icon 1001 in order to receive the specified audio information from another electronic device and reproduce the audio information in the first electronic device 101, and then output the reproduced audio information via the output unit 103. The electronic device 101 may display on the display 150 the device list 1103 (for example, a device list with respect to at least one device connected through communication with the electronic device 101 capable of receiving reproduction stop request information) with respect to devices connected to the output device 103 in response to a user's input for selecting the device change icon 1101. The electronic device 101, while providing the device list 1103, may display at least once the paired devices (e.g., MS 103, MS 105) with the electronic device 101 through the specified wireless communication. In addition, the electronic device 101, in a state where another electronic device is connected to the output device 103, when the electronic device 101 makes a change of the device that is connected to the output device 103, may determine another electronic device that can receive reproduction stop request information and then provide the determined device by including the determined device in the device list 1103.

According to an embodiment, the electronic device 101 may display the device in which audio data is being reproduced, among at least one device connected through wireless communication, on the device list 1103. To this end, the electronic device 101 may perform the operation for determining whether to reproduce audio data by other electronic devices that are connected through wireless communication.

According to an embodiment, the electronic device 101 may transmit/receive (or, synchronize) information on the running program (or application) to/from at least one device connected through wireless communication for each specified time based on the configured information. The electronic device 101, at the time point when the device change icon 1101 is selected, may display another electronic device reproducing the audio data based on the information running on the another electronic device. According to an embodiment, the electronic device 101 may display the device connected with the specific electronic device (for example, output device 103). The electronic device 101 may receive information of devices connected with respective devices through wireless communication, from at least one device connected through wireless communication. The electronic equipment 101, based on the received information, may display at least one other electronic device (for example, electronic device 102) connected to a particular electronic device (for example, output device 103).

The electronic device 101, in displaying the device change icon 1101, may display the device change icon 1101 by changing the shape or design of the device change icon 1001 in response to various situations such as a method of changing the device for reproducing the audio data from the electronic device 101 to another electronic device, or a method of changing from another electronic device to the electronic device 101. For example, the device change icon 1101 may be provided in various ways, such as currently in a state where another electronic device is connected to the output device 103 and in a state capable of performing a device change from another electronic device to the electronic device 101. According to an embodiment, as shown in FIG. 11, when the electronic device is capable of performing a device change from another electronic device to the electronic device 101, indicator (e.g., arrows) in a downward direction can be included and provided in the device change icon 1101.

Figure 12:
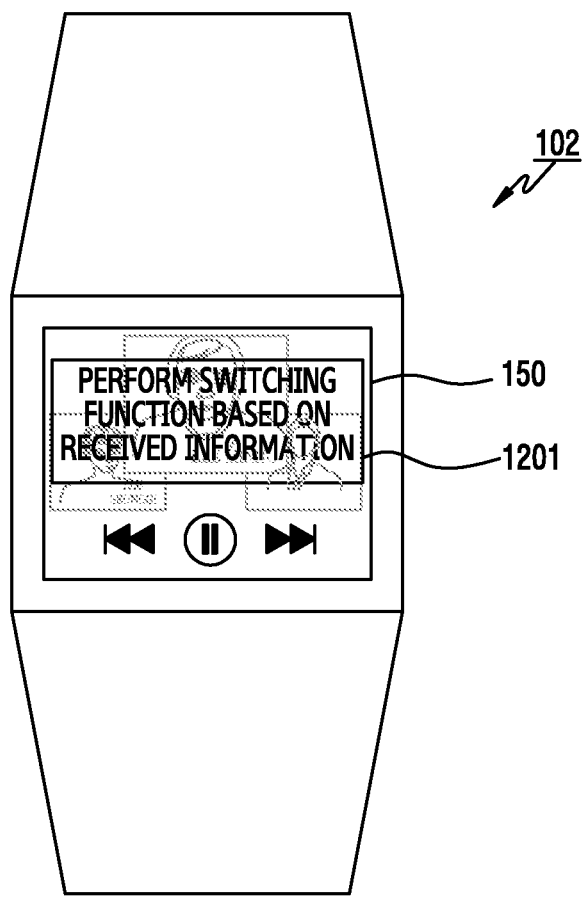
FIG. 12 is a diagram showing an operational example of outputting a message corresponding to a change of a device for reproducing audio data in an electronic device according to various embodiments of the present disclosure.

FIG. 12 is a diagram illustrating an operation example for changing a device for reproducing audio data in an electronic device according to various embodiments of the present disclosure.

Referring now to FIG. 12, the electronic device 102 may receive reproduction request information from at least one other electronic device (for example, electronic device 101).

The electronic device 102 may be connected to a specified output device 103 based on the received reproduction request information through wireless communication. The electronic device 102 may output audio sound via the output device 103 connected thereto based on the received reproduction request information.

The electronic device 102 may output a notification (or a message) for the operation to be performed based on the reproduction request information. According to an embodiment, the electronic device 102, when performing a specified operation (for example, an operation of connecting with the output device 103 through wireless communication, an operation of reproducing the audio sound of the specified audio data via the output device 103, etc.) based on the reproduction request information received from at least one other electronic device (for example, electronic device 101), may display a notification 1201 for the performed operation on the display 150. The electronic device 101 may display through the notification 1201, at least one of the information of the device which transmit the reproduction request information (for example, electronic device 101), the information of the output device 103 connected based on the reproduction request information, and audio information reproduced based on the reproduction request information.

The electronic device 102 may release the wireless communication connection with the output device 103 connected on the basis of the received reproduction stop request information, or display a notification corresponding to an operation of transmitting the generated reproduction stop information on the basis of the received reproduction stop request information, but is not limited to being connected to the output device 103 on the basis of the received reproduction request information and displaying the notification for an operation of reproducing the audio data. The electronic device 102, in providing notifications, is not limited to display on the display 150, and may provide notifications in various ways such as output the notification as voice through a speaker 282, or output the vibration of a specified pattern through the motor 298.

In various embodiments, in displaying notifications, it is apparent that a notification corresponding to the operation to be performed can be output such as in the case of the electronic device 101 which transmits the reproduction request information or the reproduction stop request information and then controls at least one other electronic device (for example, electronic device 102), but not limited to such as in the case of the electronic device 102 which receives the reproduction request information or the reproduction stop request information from another electronic device (for example, electronic device 101) and then performs a specified operation.

According to various embodiments, the electronic device 101 may include an operation of determining audio information to be reproduced in another electronic device and/or external output information of another electronic device, and an operation of transmitting the determined information to the another electronic device as the reproduction request information. According to an embodiment, the audio information to be reproduced may include data identification information of the audio data, the reproduction of which has stopped or is to be stopped in the electronic device. According to an embodiment, the external output information may include identification information of the external device which receives audio data reproduced and transmitted in the electronic device and outputs the audio sound of the audio data.

According to an embodiment, the another electronic device may be in a state of being connected with at least one wireless communication, and the external output information may be in a state of being connected with at least one wireless communication. According to an embodiment, when the reproduction request information is transmitted, a connection may be released from the output device. According to an embodiment, the present disclosure may further include an operation of transmitting audio data to be reproduced through an interface with another electronic device.

According to an embodiment, the present disclosure may further include an operation of stopping the reproduction and external output of the audio data of another electronic device, and an operation of identifying the stopped audio information and continuously performing the reproduction of the audio data in the electronic device. According to an embodiment, the operation of performing the reproduction of the audio data may further include an operation of outputting audio sounds through an external device by reproducing the audio data. According to an embodiment, the stopped audio information may be information having been received in response to operation of stopping the reproduction and external output of the audio data of the another electronic device. According to an embodiment, the another electronic device for stopping reproduction and external output of the audio data can release the connection with the external device which outputs the reproduction of the audio data.

As described above, according to various embodiments of the present disclosure, an electronic device transmits the information which change a device for reproducing audio data to another electronic device, and another electronic device can be controlled so as to output audio data to be reproduced to a specified output device based on the received information. Thus, various embodiments of the present disclosure, when the user wishes to change the device of reproducing and outputting audio data to another electronic device, can eliminate an inconvenience associated with the complex operation which manually releasing the connection between the electronic device and the output device and then connecting another electronic device and the output device. According to various embodiments of the present disclosure, a menu capable of selecting an electronic device to which audio data is reproduced and output can be provided, and the electronic device of reproducing and outputting audio data can be automatically switched among electronic devices, thereby improving a user's convenience.

Various embodiments executed by the electronic device 101 may be an operation that is performed by the control of a processor 120. In addition, the electronic device 101 may include a module, which is separate from the processor 120 and is programmed to control various embodiments of the present disclosure. The separate module programmed to control various embodiments of the present disclosure may be operated by the control of the processor 120.

Each of the above described elements of the electronic device according to various embodiments of the present disclosure may include one or more components, and the name of a corresponding element may vary according to the type of electronic device. The electronic device according to various embodiments of the present disclosure may include at least one of the above described elements and may exclude some of the elements or further include other additional elements. Further, some of the elements of the electronic device according to various embodiments of the present disclosure may be coupled to form a single entity while performing the same functions as those of the corresponding elements before the coupling.

The definition of the terms "unit" or "module" as referred to herein are to be understood as constituting hardware circuitry such as a CCD, CMOS, SoC, AISC, FPGA, a processor or microprocessor (a controller) configured for a certain desired functionality, or a communication module containing hardware such as transmitter, receiver or transceiver, or a non-transitory medium comprising machine executable code that is loaded into and executed by hardware for operation, in accordance with statutory subject matter under 35 U.S.C. §101 and do not constitute software per se.

According to various embodiments of the present disclosure, the "module" may be interchangeable with a term, such as a unit, a logic, a logical block, a component, or a circuit. The "module" may be a minimum unit of an integrated component element or a part thereof. The "module" may be the smallest unit that performs one or more functions or a part thereof. The "module" may be mechanically or electronically implemented. If implemented in software that is loaded into hardware for execution, a computer-readable storage medium (or storage medium readable by a computer) storing at least one program (or programming module) may be provided. The software may, for example, be implemented by instructions stored in a computer-readable storage medium in the form of a programming module. The at least one program may include instructions that cause the electronic device to perform the methods according to various embodiments of the present disclosure as defined by the appended claims and/or disclosed herein. When the command is executed by one or more processors (for example, the processor 120), the one or more processors may execute a function corresponding to the command. The computer-readable storage medium may be, for example, the memory 230. At least a part of the programming module may, for example, be implemented (e.g., executed) by the processor 120. At least a part of the programming module may, for example, include a module, a program, a routine, a set of instructions, or a process for performing at least one function.

In accordance with various embodiments of the present disclosure, provided is a computer-readable recording medium including a program for executing operations, the operations comprising when executed by a processor: outputting audio data to be reproduced through an output device connected thereto; detecting a user's input for a device change; generating reproduction request information including at least one of audio information and the output information corresponding to the audio data; and transmitting the reproduction request information to another electronic device connectable to the output device.

The computer-readable storage medium may include magnetic media such as a hard disc, a floppy disc, and a magnetic tape; optical media such as a compact disc read only memory (CD-ROM) and a digital versatile disc (DVD); magneto-optical media such as a floptical disk; a hardware device specifically configured to store and execute program instructions (e.g., programming module), such as a read only memory (ROM), a random access memory (RAM), and a flash memory; an electrically erasable programmable read only memory (EEPROM); a magnetic disc storage device; any other type of optical storage device; and a magnetic cassette. Alternatively, any combination of some or all of the may form a memory in which the program is stored. Further, a plurality of such memories may be included in the electronic device.

In addition, the program may be stored in an attachable storage device capable of accessing the electronic device through a communication network such as the Internet, an intranet, a local area network (LAN), a wide LAN (WLAN), a storage area network (SAN), or any combination thereof. The storage devices may be connected to an electronic device through an external port. Further, a separate storage device on the communication network may access a portable electronic device. Any of the hardware devices as described above may be configured to work as one or more software modules in order to perform the operations according to various embodiments of the present disclosure, and vice versa.

Any of the modules or programming modules according to various embodiments of the present disclosure may include at least one of the above described elements, exclude some of the elements, or further include other additional elements. The operations performed by the modules, programming module, or other elements according to various embodiments of the present disclosure may be executed in a sequential, parallel, repetitive, or heuristic manner. Further, some operations may be executed according to another order or may be omitted, or other operations may be added.

The embodiments of the present disclosure disclosed herein and shown in the drawings are merely specific examples presented in order to easily describe technical details of the present disclosure and to help the understanding of the present disclosure, and are not intended to limit the scope of the present disclosure. Therefore, it should be construed that, in addition to the embodiments disclosed herein, all modifications and changes or modified and changed forms derived from the technical idea of the present disclosure fall within the scope of the present disclosure.

What is claimed is:

1. A method for operating an electronic device, comprising:
    outputting audio data through an output device connected to the electronic device;
    detecting, by the electronic device, a user input for a device change;
    generating, by the electronic device, reproduction request information including at least one of audio information and output information corresponding to the audio data in response to detecting the user input; and
    transmitting, by the electronic device, the reproduction request information to another electronic device for reproducing the audio data and outputting the audio data through the output device.

2. The method of claim 1, wherein the reproduction request information is transmitted to the other electronic device connected to the electronic device, and includes information requesting the other electronic device to connect with the output device and information requesting output of audio sound of the audio data via the output device by reproducing the audio data based on the audio information.

3. The method of claim 1, wherein the audio information comprises data identification information of the audio data being reproduced in the electronic device or the reproduction of which is to be stopped, and
    the output information comprises device identification information of the output device connected to the electronic device and outputs audio sound of the audio data reproduced in the electronic device.

4. The method of claim 1, wherein the transmitting reproduction request information includes a command for releasing the connection with the output device.

5. The method of claim 1, wherein the transmitting reproduction request information further comprises transmitting to the other electronic device the audio data to be reproduced.

6. The method of claim 1, comprising:
    connecting, by the other electronic device, to the output device based on the reproduction request information; and
    reproducing the audio data based on the reproduction request information and outputting the audio data through the output device.

7. The method of claim 1, further comprising:
    controlling, by the electronic device, a stopping of the reproduction of the audio data of the other electronic device;
    receiving the audio information associated with the audio data from the other electronic device; and
    identifying the received audio information and executing the reproduction of the audio data in the electronic device.

8. The method of claim 7, wherein the executing the reproduction further comprises:
    reproducing the audio data at a point in time where the reproduction of the audio data has stopped in the other electronic device, and outputting the audio data through the output device.

9. The method of claim 7, further comprising:
    releasing by the other electronic device the connection with the output device.

10. A method for operating an electronic device comprising:
    detecting, by the electronic device, a device change;
    transmitting, by the electronic device, a reproduction stop command for stopping reproduction of audio data to another electronic device connected to an output device;
    receiving reproduction stop information corresponding to the reproduction stop command from the other electronic device;
    connecting to the output device based on the reproduction stop information; and
    reproducing audio data based on the reproduction stop information, and outputting the reproduced audio data via the output device.

11. An electronic device comprising:
    a communication interface configured for wireless communication;
    a display; and
    a processor connected functionally to the communication interface and the display, in which the processor is configured to:
    control output of audio data through an output device connected to the electronic device;
    detect a user input for a device change;
    generate reproduction request information including at least one of audio information and output information corresponding to the audio data; and
    control the communication interface to transmit the reproduction request information to another electronic device for reproducing the audio data and outputting the audio data through the output device.

12. The electronic device of claim 11, wherein the reproduction request is transmitted to the other electronic device connected to the electronic device, and includes information that requests the other electronic device connect with the output device and information that requests output of audio sound of the audio data via the output device by reproducing the audio data based on the audio information.

13. The electronic device of claim 11, wherein the audio information comprises data identification information of the audio data being reproduced in the electronic device or the reproduction of which is to be stopped, and the output information comprises device identification information of the output device which outputs audio sound reproduced and transmitted in the electronic device.

14. The electronic device of claim 11, wherein the processor, when controlling transmission of the reproduction request information, releases the connection with the output device.

15. The electronic device of claim 11, wherein the electronic device comprises one of a smartphone, tablet or wearable device, the other electronic device comprises one of a smartphone, tablet or wearable device and the output device comprises one of a speaker, headset or earphone.

16. The electronic device of claim 11, wherein the processor controls connection of the output device with the other electronic device according to the reproduction request information, and requests the other electronic device to reproduce the audio data based on the reproduction request information and output the audio data through the output device.

17. The electronic device of claim 11, wherein the processor is configured to:

control stopping the reproduction of the audio data by the other electronic device;

receive audio information associated with the audio data from the other electronic device; and identify the received audio information, and continuously executing the reproduction of the audio data in the electronic device.

18. The electronic device of claim 17, wherein the processor controls reproduction of the audio data from a point in time of the audio data where the reproduction of the audio data has stopped in the another electronic device, and outputs the audio data through the output device.

19. The electronic device of claim 11, wherein the processor is configured to:

detect a user's input for a change of a device;

control transmission of a reproduction stop command for stopping the reproduction of the audio data to another electronic device connected to an output device;

receive reproduction stop information corresponding to the reproduction stop command from the other electronic device;

connect to the output device based on the reproduction stop information; and reproduce the audio data based on the reproduction stop information and outputting the audio data via the output device.

20. A computer-readable recording medium comprising a program for executing operations, the operations comprising:

outputting audio data through an output device connected thereto;

detecting a user input for a device change;

generating reproduction request information including at least one of audio information and output information corresponding to the audio data; and transmitting the reproduction request information to another electronic device for reproducing the audio data and outputting the audio data through the output device.

* * * * *